(12) United States Patent
Janssens et al.

(10) Patent No.: US 10,761,286 B2
(45) Date of Patent: Sep. 1, 2020

(54) CLAMPING DEVICE

(71) Applicant: CommScope Connectivity Belgium BVBA, Kessel-Lo (BE)

(72) Inventors: Thierry Janssens, Kessel-Lo (BE); Robert Vanhentenrijk, Winksele (BE); Kurt Cornelissen, Hulshout (BE); Thomas Dietvorst, Kessel-lo (BE); James Richard, Diepenbeek (BE); Peter Jerome Istas, Sint-Truiden (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/361,506

(22) Filed: Mar. 22, 2019

(65) Prior Publication Data

US 2019/0285821 A1 Sep. 19, 2019

Related U.S. Application Data

(63) Continuation of application No. 15/343,985, filed on Nov. 4, 2016, now Pat. No. 10,274,691.

(Continued)

(51) Int. Cl.
*G02B 6/44* (2006.01)
*E05D 7/10* (2006.01)
(Continued)

(52) U.S. Cl.
CPC ......... *G02B 6/4471* (2013.01); *E05D 7/1077* (2013.01); *F16B 2/10* (2013.01);
(Continued)

(58) Field of Classification Search
CPC .......... E05D 7/1077; F16B 2/10; F16B 2/185; G02B 6/4442; G02B 6/4444; G02B 6/4471

See application file for complete search history.

(56) References Cited

U.S. PATENT DOCUMENTS 1,518,479 A 12/1924 Brewer
2,526,458 A 10/1950 Bronnenkant
(Continued)

FOREIGN PATENT DOCUMENTS

| EP | 0 824 468 | 7/1999 |
|---|---|---|
| GB | 993636 | 7/1963 |
| WO | WO 2009/089327 | 7/2009 |

OTHER PUBLICATIONS

International Search Report and Written Opinion for Application No. PCT/EP2016/076760 dated Feb. 10, 2017.

(Continued)

*Primary Examiner* — Robert Sandy
*Assistant Examiner* — David M Upchurch
(74) *Attorney, Agent, or Firm* — Merchant & Gould P.C.

(57) ABSTRACT

A clamp assembly includes a first clamp half-piece and a second clamp half-piece. In one example, the clamp half-pieces are identically shaped. In one example, each of the clamp half-pieces has at least one integral pin and at least one aperture. The first and second clamp half-pieces are pivotally connected to each other via a first snap-fit interface in which the integral pin of the first clamp half-piece snap-fits into the at least one aperture of the second clamp half-piece. The clamp assembly can also include a link arm connected to the first clamp half-piece via a second snap-fit interface. A lever arm can also be included that is pivotally connected to the link arm via a third snap-fit interface. The clamp assembly does not require separate link pins or other parts and only includes four components: the clamp half-pieces, the link arm, and the lever arm.

15 Claims, 21 Drawing Sheets

Related U.S. Application Data

(60) Provisional application No. 62/252,022, filed on Nov. 6, 2015.

(51) Int. Cl.
 *F16B 2/10* (2006.01)
 *F16B 2/18* (2006.01)

(52) U.S. Cl.
 CPC ............ *F16B 2/185* (2013.01); *G02B 6/4442* (2013.01); *G02B 6/4444* (2013.01)

(56) References Cited

U.S. PATENT DOCUMENTS

| | | | |
|---|---|---|---|
| 2,752,174 A | 6/1956 | Frost | |
| 2,775,806 A | 1/1957 | Love | |
| 3,352,582 A * | 11/1967 | Mankin | F16L 3/01 403/56 |
| 3,497,908 A | 3/1970 | Zamarra | |
| 3,936,907 A | 2/1976 | Jansons | |
| 4,302,866 A | 12/1981 | Irvin | |
| 4,490,891 A | 1/1985 | Begley | |
| 4,573,717 A | 3/1986 | Peacock | |
| 4,666,068 A | 5/1987 | Bush | |
| 4,969,923 A | 11/1990 | Reeder | |
| 5,195,648 A | 3/1993 | Harris | |
| 5,829,106 A | 11/1998 | Dams et al. | |
| 6,840,782 B1 | 1/2005 | Borden | |
| 8,989,550 B2 | 3/2015 | Allen et al. | |
| 9,004,545 B2 * | 4/2015 | Whitaker | A61M 39/1011 285/419 |
| 9,341,291 B2 | 5/2016 | Sandman | |
| 2004/0256138 A1 | 12/2004 | Grubish | |
| 2008/0295567 A1 | 12/2008 | Thielgas | |
| 2010/0327576 A1 | 12/2010 | Linhorst | |
| 2012/0227221 A1 | 9/2012 | Whitaker | |

OTHER PUBLICATIONS

Extended European Search Report for Application 16197447.2 dated Mar. 16, 2017.

* cited by examiner

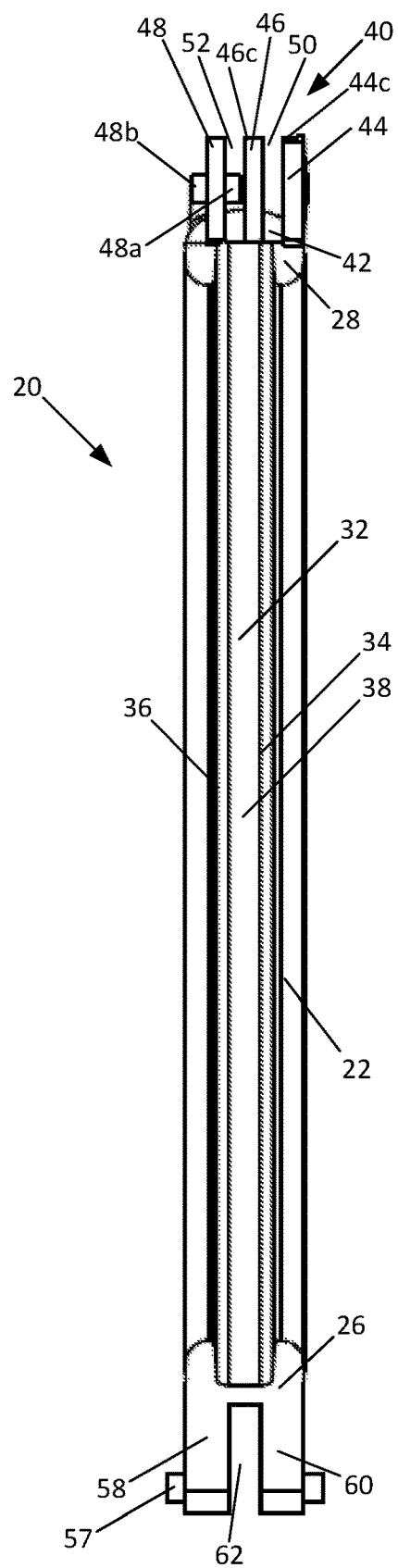
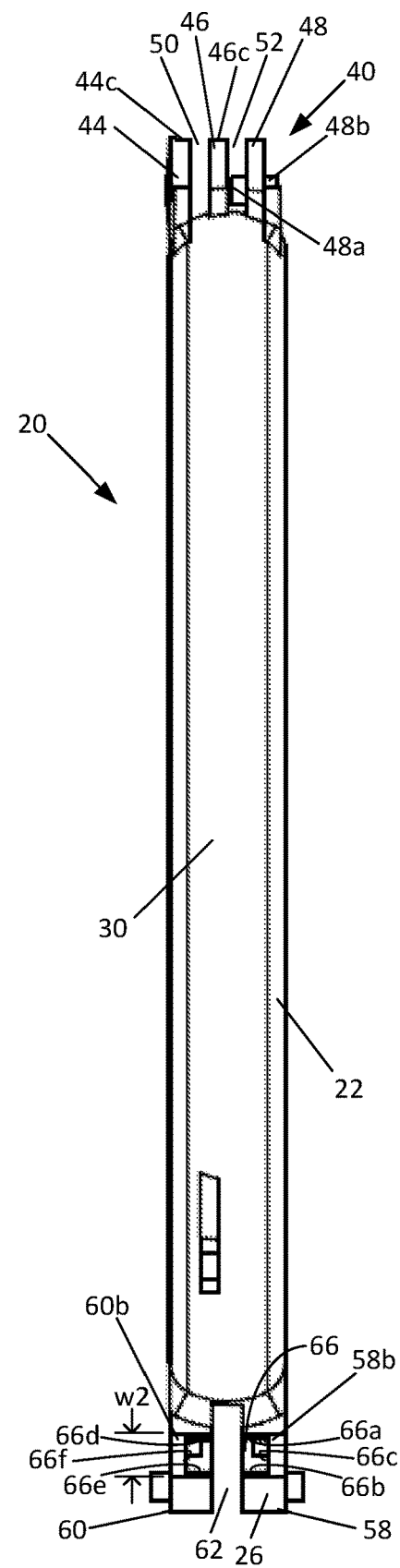

CLAMPING DEVICE

RELATED APPLICATIONS

This application is a continuation of application Ser. No. 15/343,985, filed Nov. 4, 2016, now U.S. Pat. No. 10,274,691, which application claims the benefit of provisional application Ser. No. 62/252,022, filed Nov. 6, 2015, and titled "Clamping Device," which applications are incorporated herein by reference in their entirety.

BACKGROUND

Enclosures are commonly provided to house telecommunications equipment, for example fiber optic enclosures. Some enclosures include removable covers that can be secured to a base by a clamp assembly.

SUMMARY

In one aspect of the disclosure, a clamp assembly is disclosed. The clamp assembly can include first and second clamp half-pieces, each of which has a generally semi-circular body that extends along a curved path between first and second ends. The clamp half-pieces can be pivotally connected to each other at their first ends at a first snap-fit interface that does not include any loose pins separate from the first and second clamp half-pieces. The first and second clamp half-pieces can be pivotally movable relative to one another about a pivot axis located at the snap-fit interface between an open configuration and a closed configuration. In one aspect, the first and second clamp half-pieces cooperate to define a generally circular shape centered about a central clamp axis. The first and second clamp pieces can define channels having open sides that face toward the central clamp axis when the clamp is in the closed configuration. The channels can have transverse cross-sectional profiles that gradually narrow as the transverse cross-sectional profiles extend from the open sides of the channels radially outwardly from the central clamp axis.

The clamp assembly can also include a latch arrangement for drawing the second ends of the first and second clamp half-pieces together to move and secure the clamp into the closed configuration. The latch arrangement can include a first latch component unitarily formed with the second end of the second clamp half-piece. The first latch component can include a first over-the-center cam surface. The latch arrangement can also include a link arm having a first end pivotally connected to the second end of the first clamp half-piece by a second snap-fit interface that does not include any loose pins. The latch arrangement may further include a lever arm pivotally connected to a second end of the link arm by a third snap-fit interface that does not include any loose pins. The lever arm can include a second over-the-center cam surface that engages the first over-the-center cam surface to draw the second ends of the first and second clamp half-pieces toward each other and into a secured, locked configuration.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 12 is a first side view of the clamp half-piece shown in FIG. 9.

FIG. 13 is a second side view of the clamp half-piece shown in FIG. 9.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts. Additionally, any examples set forth in this specification are not intended to be limiting and merely set forth some of the many possible embodiments for the appended claims.

Figure 31:
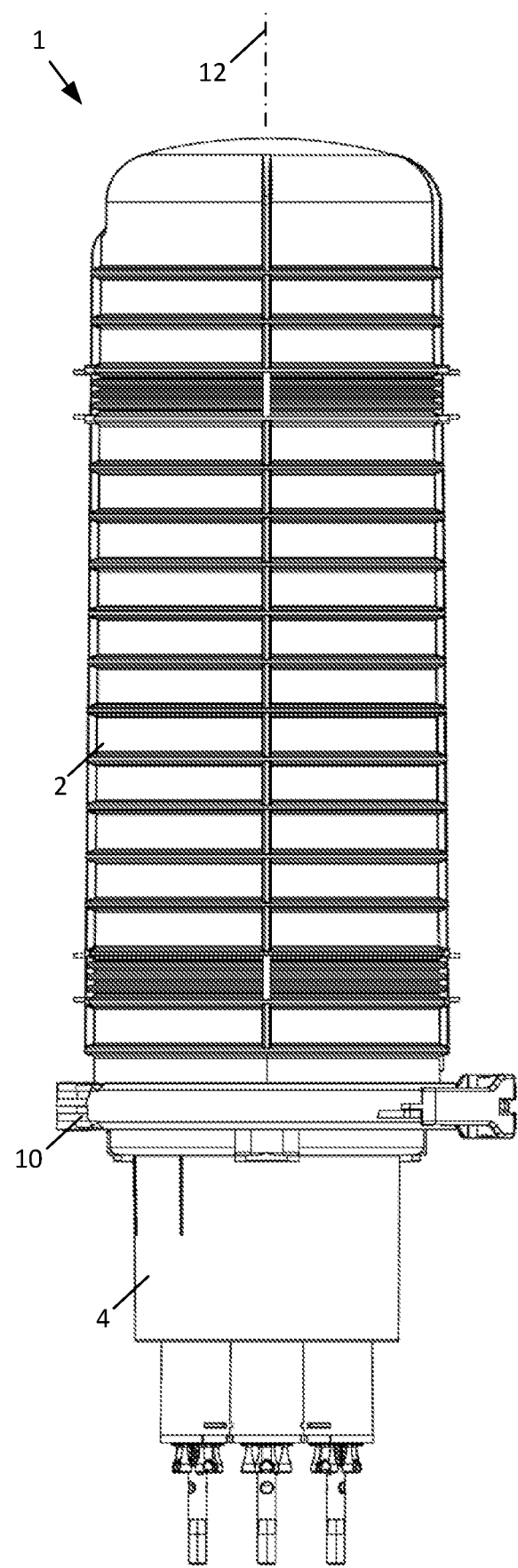
FIG. 31 is a side view of a telecommunications enclosure utilizing the clamp assembly shown in FIG. 1.

Referring to FIGS. 1-8, a clamp assembly 10 for a telecommunications enclosure is presented. One example of a telecommunications enclosure 1 is shown at FIG. 31 in which the clamp assembly 10 secures a dome portion 2 to a base portion 4. The telecommunications enclosure shown at FIG. 31 is further shown and described in U.S. Pat. No. 8,989,550 issued on Mar. 24, 2015, the entirety of which is incorporated by reference herein. As shown, the clamp assembly 10 is formed about a central clamp axis 12 by a pair of clamp half-pieces 20a, 20b (generally referred to as half-piece 20) that are pivotally connected to each other. In the embodiment shown, the clamp half-pieces are identical to each other. However, the clamp half-pieces can be non-identically shaped. Each clamp half-piece 20 has a body 22 extending along a semi-circular curved path between a first end 26 and a second end 28.

In one aspect, the clamp half-pieces 20a, 20b are pivotally connected to each other at a snap-fit interface 40 proximate the second end 28. The snap-fit interface 40 allows the clamp half-pieces 20a, 20b to rotate with respect to each other about a pivot axis 16 of the snap-fit interface 40. The snap-fit interface 40 is formed by providing each clamp half-piece 20 with a base 42 from which channel defining members 44, 46, 48 extend to form a first channel 50 and a second channel 52. The third member 48 is provided with a first pin projection 48a and a second pin projection 48b while the first and second members 44 and 46 are respectively provided with apertures 44a, 46a. The apertures 44a, 46a of one clamp half-piece 20a/20b are for receiving the pin projections 48a, 48b of the other clamp half-piece 20a, 20b. In the embodiment shown, the pin projections 48a, 48b; the channel defining members 44, 46, 48; and the base 42 are all integrally formed as a single component with the clamp half-piece 20, thereby removing the necessity to have a separate pin or attachment structure for joining the two clamp half-pieces 20a, 20b together. As shown, the channel defining member 44 is provided with a domed or mushroom shaped outer surface to add material at the location of the aperture 44a for the purpose of reducing stresses.

Figure 14:
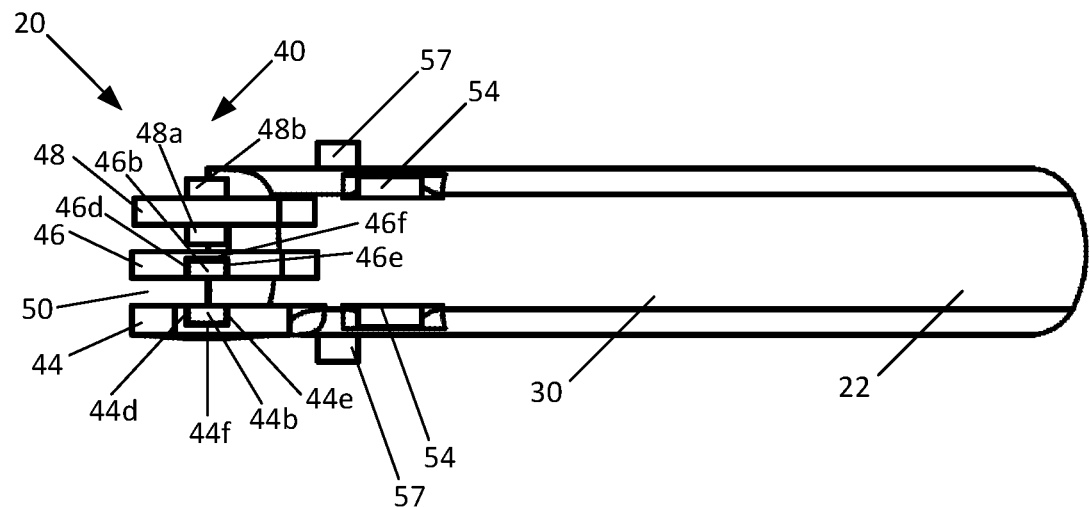
FIG. 14 is a third side view of the clamp half-piece shown in FIG. 9.
Figure 15:
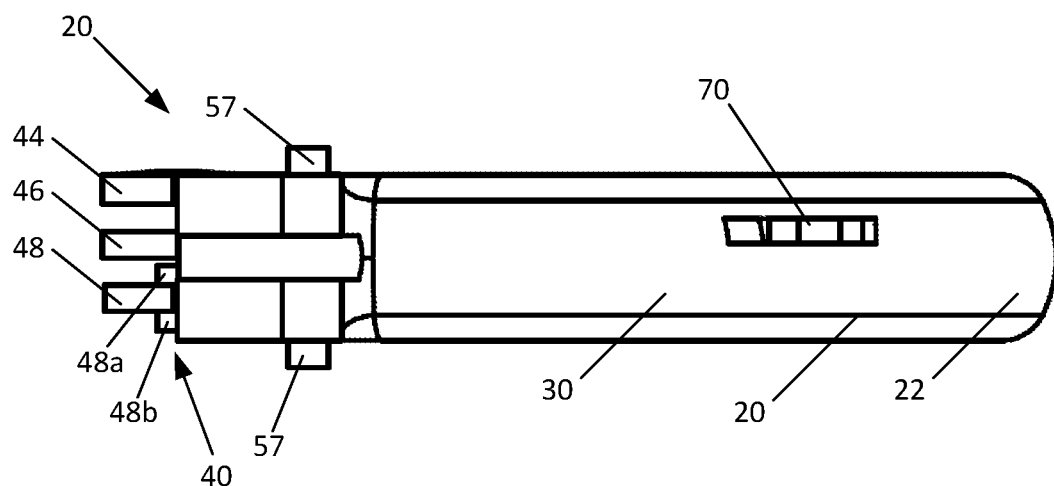
FIG. 15 is a fourth side view of the clamp half-piece shown in FIG. 9.

The pin projections 48a, 48b extend a distance further away from the third member 48 than the dimension of space defined between the members 44 and 46. To facilitate insertion of the pin projections 48a, 48b in the space between the members 44 and 46, each of the members 44 and 46 is also respectively provided with a slot structure 44b, 46b extending from the apertures 44a, 46a in a direction away from the central axis 12 and to a distal end 44c, 46c of the members 44, 46. As most easily seen at FIG. 14, the slot structure 44b is defined by a pair of side walls 44d, 44e extending from an end wall 44f. Similarly, the slot structure 46b is defined by a pair of side walls 46d, 46e extending from an end wall 46f.

The end walls 44f, 46f each angle towards the channel 50 as they approach the apertures 44a, 46a. As the end walls 44f, 46f are disposed opposite each other, they give the slot structure a tapering or narrowing shape in a direction towards the apertures 44a, 46a. Additionally, sidewalls 44d and 44e each angle towards each other as they approach the apertures 44a, 46a while sidewalls 46d and 46e also angle towards each other as they approach the apertures 44a, 46a. Thus, the slot structure narrows not only in the direction between the end walls 44f and 46f but also in the direction between walls 44d and 44e and between walls 46d and 46e.

During assembly, when the pin projections 48a, 48b of one half-piece 20 are introduced into the slot structures 44b, 46b of the other half-piece, the pins projections 48a, 48b are guided by the side walls 44d/44e and 46d/46e and engage against the end walls 44f, 46f. The distance between the end walls 44f, 46f adjacent the distal end 44c, 46c is the same or greater than the distance between the ends of the pin projections 48a, 48b and tapers to a distance that is less than the distance between the ends of the pin projections 48a, 48b at a location adjacent the apertures 44a, 46a. Similarly, the distance between the sidewalls 44d/44e and 46d/46e tapers or narrows from the distal end 44c to a distance that is less than the width of the pin projections 48a, 48b.

Figure 27:
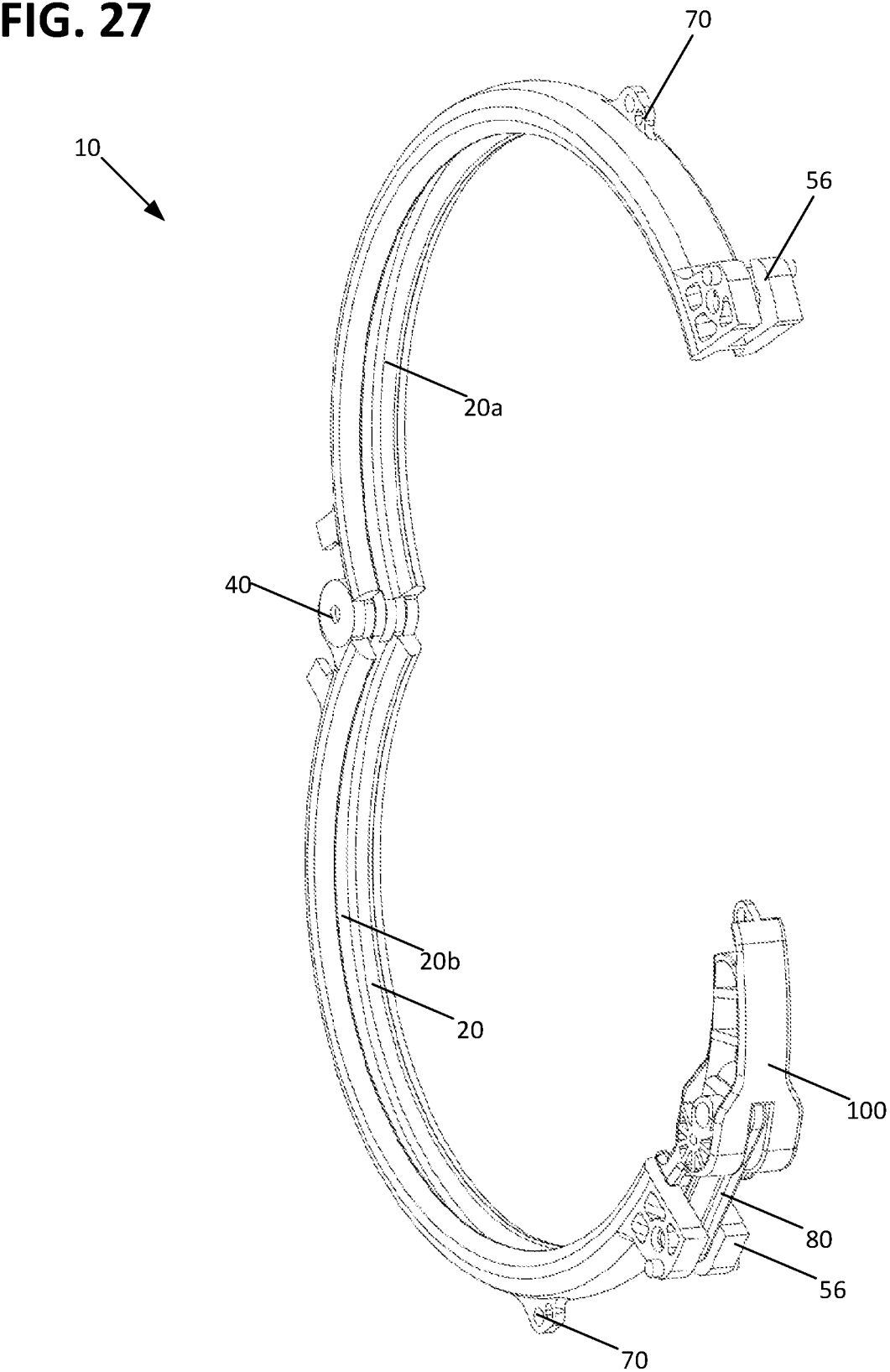
FIG. 27 is a perspective view of the clamp assembly shown in FIG. 1, but in an open position.

Due to this configuration, the members 44 and 46 gradually deflect away from each other by force of the pin projections 48a, 48b until the pin projections 48a, 48b are fully received into the apertures 44a, 46a. Simultaneously, the sidewalls 44d/44e and 46d/46e gradually deflect, deform, and/or compress until the pin projections 48a, 48b are fully received into the apertures 44a, 46a. Once the pin projection 48a, 48b are fully received, the members 44 and 46 snap back into their relaxed state. In this manner, a pivotal snap-fit type connection is formed between the two clamp half-pieces 20a, 20b such that the clamp 10 can be rotated between a closed position (FIGS. 1-8 and 28-30) and an open position (FIG. 27). To aid in insertion, the pin projections 48a, 48b may also be provided with a tapered or frustoconical shape.

In the example shown, the pin projections 48a, 48b have a first snap-fit connection in a first direction that is parallel to the longitudinal axis of the pin projections 48a, 48b (i.e. axis 16) and a second snap-fit connection in a second direction that is orthogonal to this axis. In this manner, a pivotal double action snap-fit type connection is formed between the clamp half pieces 20a, 20b. As the snap-fit connection between the clamp half pieces 20a, 20b is formed in two different directions, the force required to remove the pin projections 48a, 48b from the apertures 44a, 46a is significantly increased. In some examples, the removal force achievable with the disclosed double action snap-fit connection exceeds the material strength of the pin projections 48a, 48b and/or the clamp half-pieces 20a, 20b.

Each of the clamp half-pieces 20 is also provided with a pair of stop members 54 proximate the second end 28. As shown, the stop members 54 are integrally formed with the body 22. As the clamp assembly 10 is moved into a fully opened position, the stop members 54 are brought into contact with each other to limit any further rotation of the clamp half-pieces 20a, 20b. In the embodiment shown, the stop members 54 are configured such that the clamp half-pieces are allowed to rotate about 180 degrees, or slightly less, relative to each other from the closed position before being prevented from further rotation towards the open position by the stop members 54. The stop members 54 can be configured to allow for any desired maximum opening angle, including angles less than 180 degrees.

As shown, each of the clamp half-pieces 20a, 20b is provided with a latch component 56 located proximate the first end 26. The latch component 56 is formed integrally with the body 22. The latch component 56 is configured to pivotally connect to a link member 80 (see FIGS. 23-26) via pin projections 84a and 84b of a main body 82. The latch component 56 is also configured to engage with a lever arm 100 pivotally connected to the link member 80 via pin projections 86a, 86b of the link member 80. Each of these functions is separately performed on one the half-pieces 20a, 20b such that the latch component 56 of one of the clamp half-pieces 20a, 20b will pivotally connect to the link member 80 while the latch component 56 of the other clamp half-piece 20a, 20b will engage with the lever member 100. Taken together, the latch component 56, the link arm 80, and the lever arm 100 form a latch arrangement.

The latch component 56 is provided with a first member 58 and a second member 60 that together define a slot or channel 62 through which a link member 80 can pass. The first and second members 58, 60 are each provided with an aperture 58a, 60a for receiving pins 84a, 84b of the link member 80. The latch component 56 is further provided with a slot structure 66 extending transversely through the first and second members 58, 60 from a second end 56b of the latch component 56 towards a first end 56a of the latch component 56 which coincides with the first end 26. As shown, the slot structure is defined by sidewalls 66a and 66b extending from an end wall 66c in the first member 58 and by sidewalls 66d and 66e extending from an end wall 66f.

The end walls 66c, 66f each angle towards the channel 62 as they approach the apertures 58a, 60a. As the end walls 66c, 66f are disposed opposite each other, they give the slot structure 66 a tapering or narrowing shape in a direction towards the apertures 58a, 60a. Additionally, sidewalls 66a and 66b each angle towards each other as they approach the apertures 58a, 60a while sidewalls 66d and 66e also angle towards each other as they approach the apertures 58a, 60a. Thus, the slot structure 66 narrows not only in the direction between the end walls 66c and 66f but also in the direction between walls 66a and 66b and between walls 66d and 66e.

During assembly, when the pin projections 84a, 84b of the link member 80 are introduced into the slot structure 66, the pins projections 84a, 84b are guided by the side walls 66a/66b and 66d/66e and engage against the end walls 66c, 66f. However, it is noted that the pin projections 84a, 84b are not completely round and instead have opposite flat sides defining a width w1 which is the same or slightly less than a width w2 of the slot structure 66. Accordingly, the pin projections 84a, 84b can only be received by the slot structure 66 when the link member 80 is sufficiently aligned such that its longitudinal axis 81 is generally parallel to the length of the slot structure 66 (i.e. generally parallel to an axis 67 of the slot structure 66, generally parallel to the walls 66a/66b/66d/66e, or generally orthogonal to axis 14).

It is additionally noted that the distance between the end walls 66c, 66f adjacent the second end 56b is the same or greater than the distance between the ends of the pin projections 84a, 84b while the distance between the sidewalls 66a/66b and 66d/66e adjacent the second end 56b is the same or greater than the distance between the flat sides or width of the pin projections 84a, 84b. The distance between the end walls 66c, 66f tapers or narrows from the second end 56b to a distance that is less than the distance between the ends of the pin projections 84a, 84b at a location adjacent the apertures 58a, 60a. Similarly, the distance between the sidewalls 66a/66b and 66d/66e tapers or narrows from the second end 56b to a distance that is less than the width of the pin projections 84a, 84b.

Due to the above described configuration, once the link member 80 is properly aligned and inserted into the slot structure 66, the members 58 and 60 gradually deflect away from each other until the pin projections 84a, 84b are fully received into the apertures 58a, 60a. Simultaneously, the sidewalls 66a/66b and 66d/66e gradually deflect, deform, and/or compress until the pin projections 84a, 84b are fully received into the apertures 58a, 60a. Once the pin projection 84a, 84b are fully received the members 58 and 60 snap back into their relaxed state, as do the end walls 66a/66b and 6d/66e, the link member 80 becomes rotatable with respect to the clamp half-piece 20 about a pivot axis 11.

In the example shown, the pin projections 84a, 84b have a first snap-fit connection with the slot structure 66 in a first direction that is parallel to the longitudinal axis of the pin projections 84a, 84b (i.e. axis 11) and a second snap-fit connection in a second direction that is orthogonal to this axis. In this manner, a pivotal double action snap-fit type connection is formed between the link member 80 and the latch structure 56 of the clamp half-piece body 22. As the snap-fit connection between the link member 80 and the slot structure 66 is formed in two different directions, the force required to remove the pin projections 84a, 84b from the apertures 58a, 60a is significantly increased. In some examples, the removal force achievable with the disclosed double action snap-fit connection exceeds the material strength of the link member 80 and/or the pin projections 84a, 84b.

Referring to FIGS. 17 to 22, the lever arm 100 is presented in greater detail. As mentioned previously, the lever arm 100 is pivotally connected to the link arm 80. As shown, the lever arm 100 has a main body 102 defining a handle portion 104 and first and second members 106, 108. The first member 106 and the second member 108 together define a slot or channel 110 through which the link member 80 can pass. The first and second members 106, 108 are each provided with an aperture 106a, 108a for receiving pins 86a, 86b of the link member 80. The lever arm main body 102 is shown as being formed with internal structures 103, such as ribs and spokes which allow for the shape of the lever arm 100 to be created with a minimum of material while providing sufficient structural strength.

The lever arm 100 is further provided with a slot structure 166 extending transversely through the first and second members 106, 108 from a bottom portion 102a of the lever arm 100 towards a top portion 102b of the lever arm 100. As shown, the slot structure 166 is defined by sidewalls 166a and 166b extending from an end wall 166c in the first member 106 and by sidewalls 166d and 166e extending from an end wall 166f. The end walls 166c, 166f each angle towards the channel 110 as they approach the apertures 106a, 108a. As the end walls 166c, 166f are disposed opposite each other, they give the slot structure 166 a tapering or narrowing shape in a direction towards the apertures 106a, 108a. Additionally, sidewalls 166a and 166b each angle towards each other as they approach the apertures 106a, 108a while sidewalls 166d and 166e also angle towards each other as they approach the apertures 106a, 108a. Thus, the slot structure 166 narrows not only in the direction between the end walls 166c and 166f but also in the direction between walls 166a and 166b and between walls 166d and 166e.

During assembly, when the pin projections 86a, 86b of the link member 80 are introduced into the slot structure 166, the pins projections 86a, 86b are guided by the side walls 166a/166b and 166d/166e and engage against the end walls 166c, 166f. However, it is noted that the pin projections 86a, 86b are not completely round and instead have opposite flat sides defining a width w1 which is the same or slightly less than a width w3 of the slot structure 166. Accordingly, the pin projections 86a, 86b can only be received by the slot structure 166 when the link member 80 is sufficiently aligned such that its longitudinal axis 81 is generally parallel to the length of the slot structure 166 (i.e. generally parallel to an average or approximate axis 112 of the slot structure 166, or generally parallel to walls 166a/166b/166d/166e).

It is additionally noted that the distance between the end walls 166c, 166f adjacent the bottom portion 102a is the same or greater than the distance between the ends of the pin projections 86a, 86b while the distance between the sidewalls 166a/166b and 166d/166e adjacent the bottom portion 102a is the same or greater than the distance between the flat sides or width of the pin projections 86a, 86b. The distance between the end walls 166c, 166f tapers or narrows from the bottom portion 102a to a distance that is less than the distance between the ends of the pin projections 86a, 86b at a location adjacent the apertures 106a, 108a. Similarly, the distance between the sidewalls 166a/166b and 166d/166e tapers or narrows from the bottom portion 102a to a distance that is less than the width of the pin projections 86a, 86b.

Due to the above described configuration, once the link member 80 is properly aligned and inserted into the slot structure 166, the members 106 and 108 gradually deflect away from each other until the pin projections 86a, 86b are fully received into the apertures 106a, 108a. Simultaneously, the sidewalls 166a/166b and 166d/166e gradually deflect, deform, and/or compress until the pin projections 86a, 86b are fully received into the apertures 106a, 108a. At this point, the members 106 and 108 snap back into their relaxed state, as do the end walls 166a/166b and 166d/166e, and the lever arm 100 is rotatable with respect to the link arm 80 about a pivot axis 17. In this manner, a pivotal snap-fit type connection is formed between the link member 80 and the lever arm 100.

In the example shown, the pin projections 86a, 86b have a first snap-fit connection with the slot structure 166 in a first direction that is parallel to the longitudinal axis of the pin projections 86a, 86b (i.e. axis 17) and a second snap-fit connection in a second direction that is orthogonal to this axis. In this manner, a pivotal double action snap-fit type connection is formed between the link member 80 and the lever arm 100. As the snap-fit connection between the link member 80 and the slot structure 66 is formed in two different directions, the force required to remove the pin projections 86a, 86b from the apertures 106a, 108a is significantly increased. In some examples, the removal force achievable with the disclosed double action snap-fit connection exceeds the material strength of the link member 80 and/or the pin projections 86a, 86b.

Figure 28:
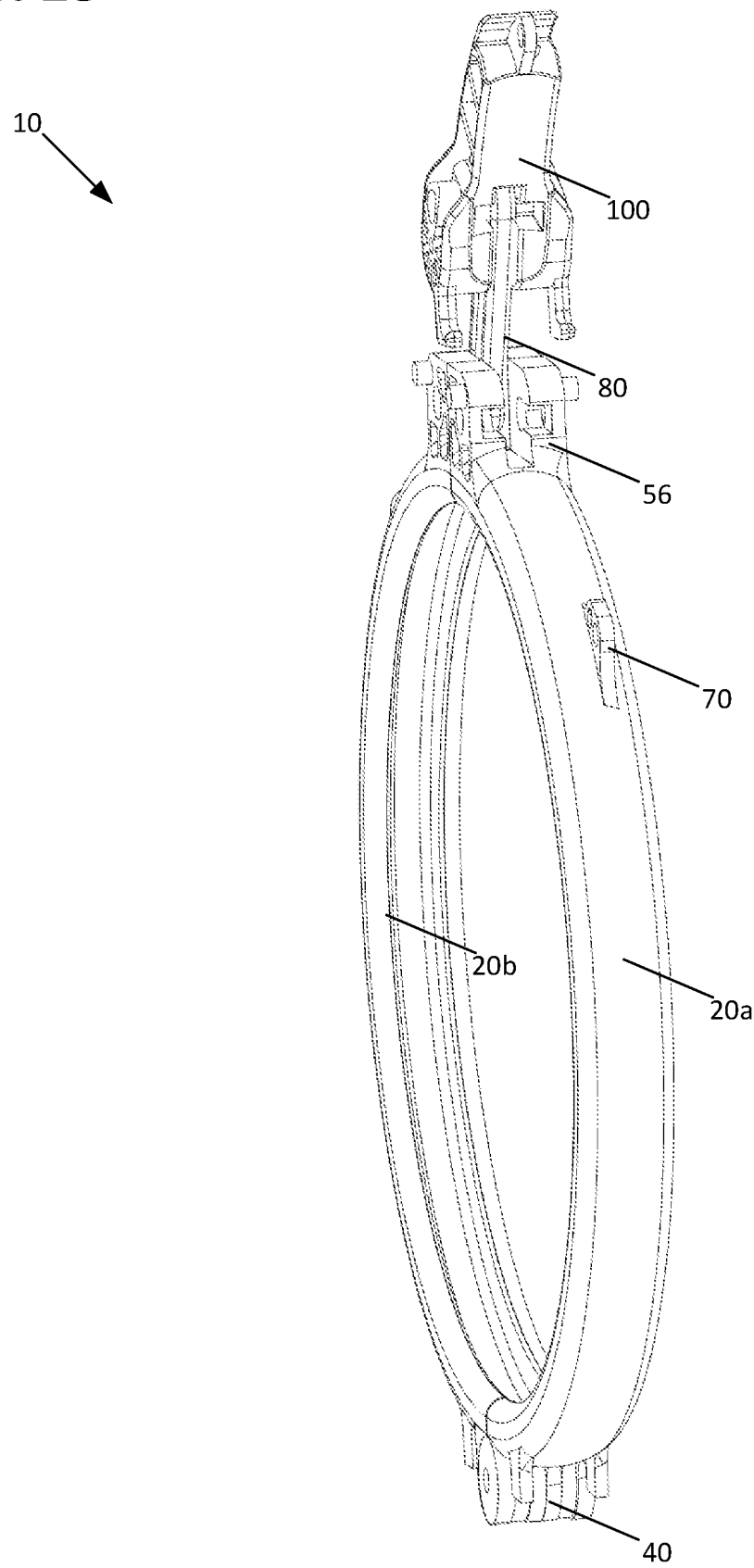
FIG. 28 is a perspective view of the clamp assembly shown in FIG. 1, with the clamp assembly in a closed, fully unlatched position.
Figure 29:
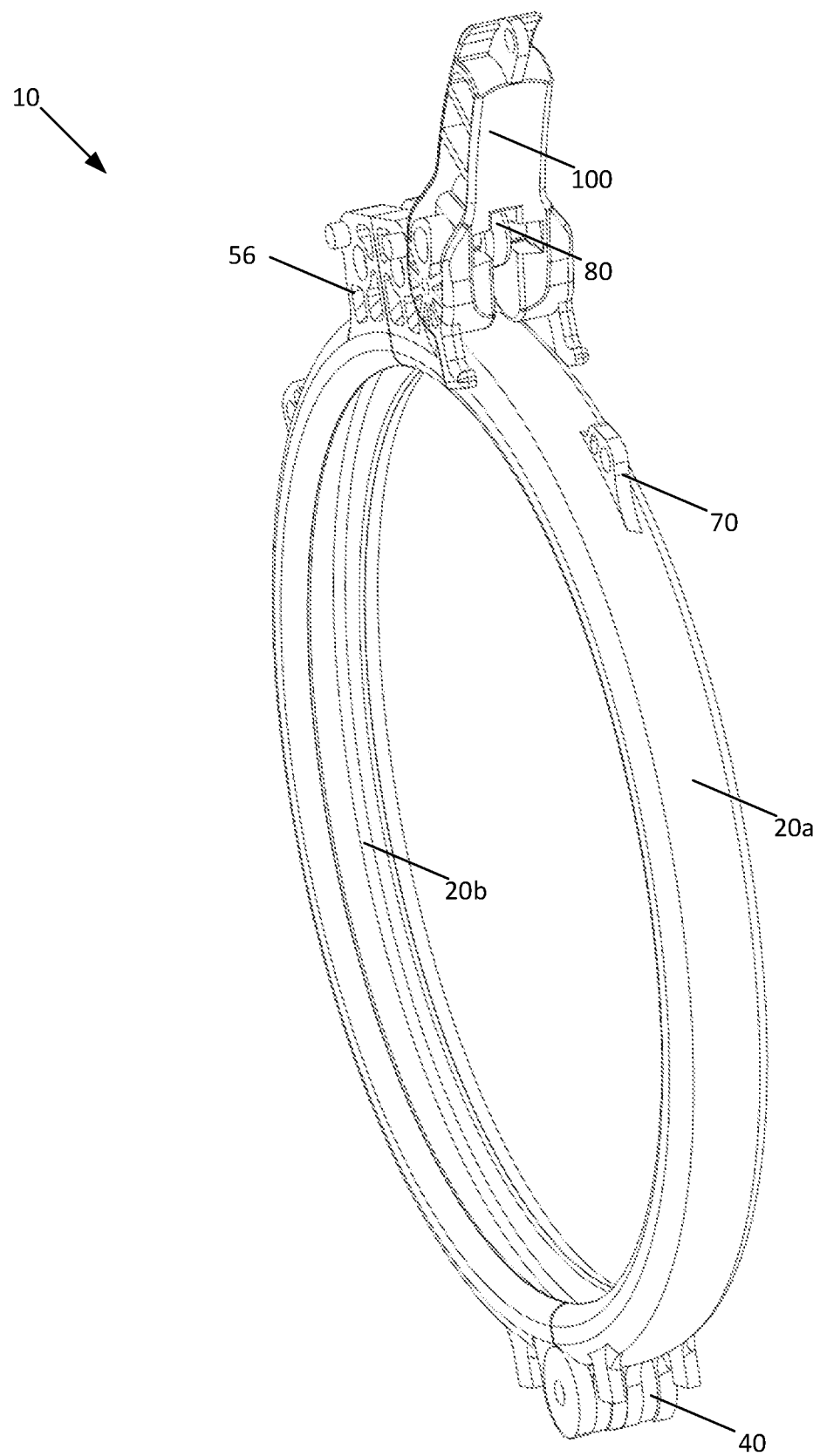
FIG. 29 is a perspective view of the clamp assembly shown in FIG. 1, with the clamp assembly in a closed, partially latched position.

The first and second members 106, 108 of the lever arm 100 are each further provided with an over-the-center cam surface 106b, 108b configured to slidably engage against a corresponding over-the-center cam surface 58b, 60b of the first and second member 58, 60 on the latch component 56. The over-the-center cam surfaces allow for the lever arm 100 to be rotated about the pivot axis 17 to draw the first and second clamp-half pieces 20a, 20b together in a secured position. Referring to FIG. 28, it can be seen that the lever arm 100 is held above the latch component 56 such that the link arm 80 can be rotated about the pivot axis 11 within clamp half-piece 20b to bring the lever arm 100 over to the clamp half-piece 20a. FIG. 29 shows the lever arm 100 having been moved in this fashion until the over-the-center cam surfaces 58b/60b are engaged against the over-the-center cam surfaces 106b/108b.

From the position shown in FIG. 29, the lever arm 100 can be rotated about pivot axis 17 until the lever arm 100 is adjacent to the clamp half-piece 20a. As the lever arm 100 is rotated about pivot axis 17 from the position shown in FIG. 29 to the position shown in FIGS. 1-8 and 30, the distance between the pivot axes 11 and 17 is increased. This effect is enabled because the over-the-center cam surfaces 106b/108b are each formed as an eccentric curve about the center of the apertures 106a/106b (i.e. pivot axis 17). Accordingly, as the lever arm 100 is moved towards the latched position, a tension force on the link arm 80 is developed which draws the first ends 26 of the clamp half-pieces 20a, 20b together.

With the lever arm 100 against the outer surface 30 of the first clamp half-piece, the clamp assembly 10 is in a closed, latched position. To further secure the clamp assembly 10 in the latched position, the lever arm 100 can be provided with a latch member 114 and a lock aperture 116 while the clamp half-piece 20a, 20b can be provided with a securing feature 70 having a latch aperture 72 and a lock aperture 74. As configured, once the lever arm 100 is moved into the fully latched position, the latch member 114 snaps into the latch aperture 72 and the lock apertures 74 and 116 become aligned. Once aligned, a lock or other securing device can be passed through the lock apertures 74 and 116 to prevent movement of the lever arm 100 out of the latched position. The latch member 114 can be disengaged from the latch aperture 72 by laterally deflecting the lever arm 100 away from the latch aperture 72.

The clamp assembly 10 can also be provided with ear structures 118 located on the lever arm 100 that interact with pin projections 57 located on the clamp half-pieces 20a, 20b. One purpose of the ear structures 118 is to provide additional reach such that an unclosed clamp assembly 10 can be drawn into the closed position where the ends 26 from the two half-pieces 20a, 20b are a certain distance away from each other. The ear structures 118 and pin projections 57 also help in opening a closed clamp assembly since they provide a lever 100 that makes this operation easier. This type of configuration is shown and disclosed in European Patent EP 0 824 468 B1, the entirety of which is incorporated by reference herein. In the embodiment shown, the ear structures 118 are integrally formed with the lever arm 100 while the pin projections 57 are integrally formed with the clamp half-pieces 20a, 20b.

Figure 30:
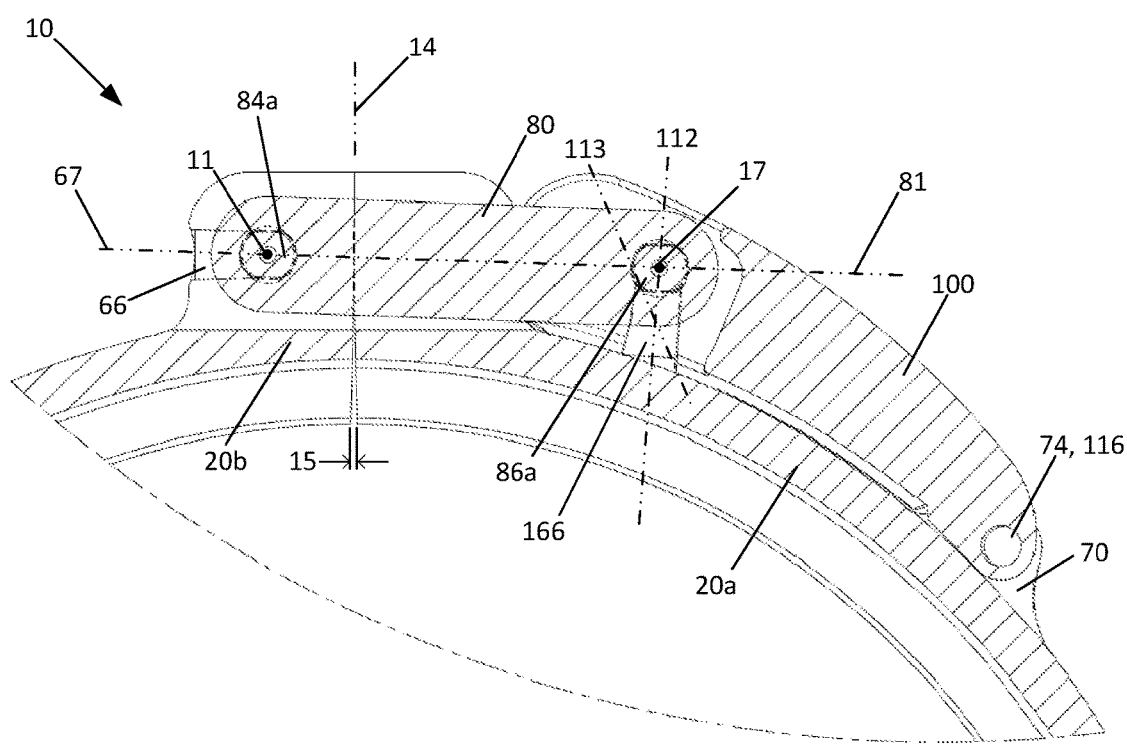
FIG. 30 is a front cross-sectional view of the clamp assembly shown in FIG. 1, with the clamp assembly in a closed, latched position.

Referring to FIG. 30, it can be seen that the specific orientation of the slot structures 66 and 166 and the pin projections 84a/84b and 86a/86b is such that the link arm 80 is securely held in place, even during periods of maximum tension. As the lever arm 100 is being moved into the latched position, the link arm 80 is completely aligned with the slot structure 66 (i.e. axes 67 and 81 are generally aligned) such that any tension on the link arm 80 will only act to draw the link arm 80 further into the slot structure 66. Likewise, as the lever arm 100 is being moved from the unlatched position to the latched position, the average or approximate axis 112 of the slot structure 166 is rotated from being generally aligned with the link arm axis 81 to being about orthogonal to the link arm axis 81. Accordingly, tension in the link arm 80 is unable to generate a significant component force that would draw the link arm 80 out of the slot structure 166.

Furthermore, the sidewalls 166e, 166b are shown as being provided with a curved or radiused shape. In the example shown, the sidewalls 166e, 166b are provided with a constant radius that intersects a tangent line 113 of the apertures 106a, 108a. This configuration is such that the pin protrusions 86a, 86b would have to travel (initially along tangent line 113 and against sidewalls 166e, 166b) away from the pin projections 84a, 84b in order for the pin protrusions 86a, 86b to move out of the slot structure 166. As the link arm 80 is relatively rigid, the link arm 80 prevents such movement and thus the curved sidewalls 166e, 166b add a further measure of protection against the pin projections snapping out of the apertures 106a, 108a.

The link arm 80 is further secured to the lever arm 100 in the latched position due to the pin projections 86a, 86b being rotated such that the flat sides are generally orthogonal to the sidewalls 166a/166b and 116d/166e of the lever arm 100. As the outer dimension of the pin projections 86a, 86b is larger than the distance w3 between the sidewalls 166a/166b and 116d/166e, the pin projections 86a, 86b are unable to travel through the slot structure 166. Accordingly, the link arm 80 is prevented from separating from the lever arm 100 even if the snap-fit connection alone was insufficient to hold the parts together.

Figure 1:
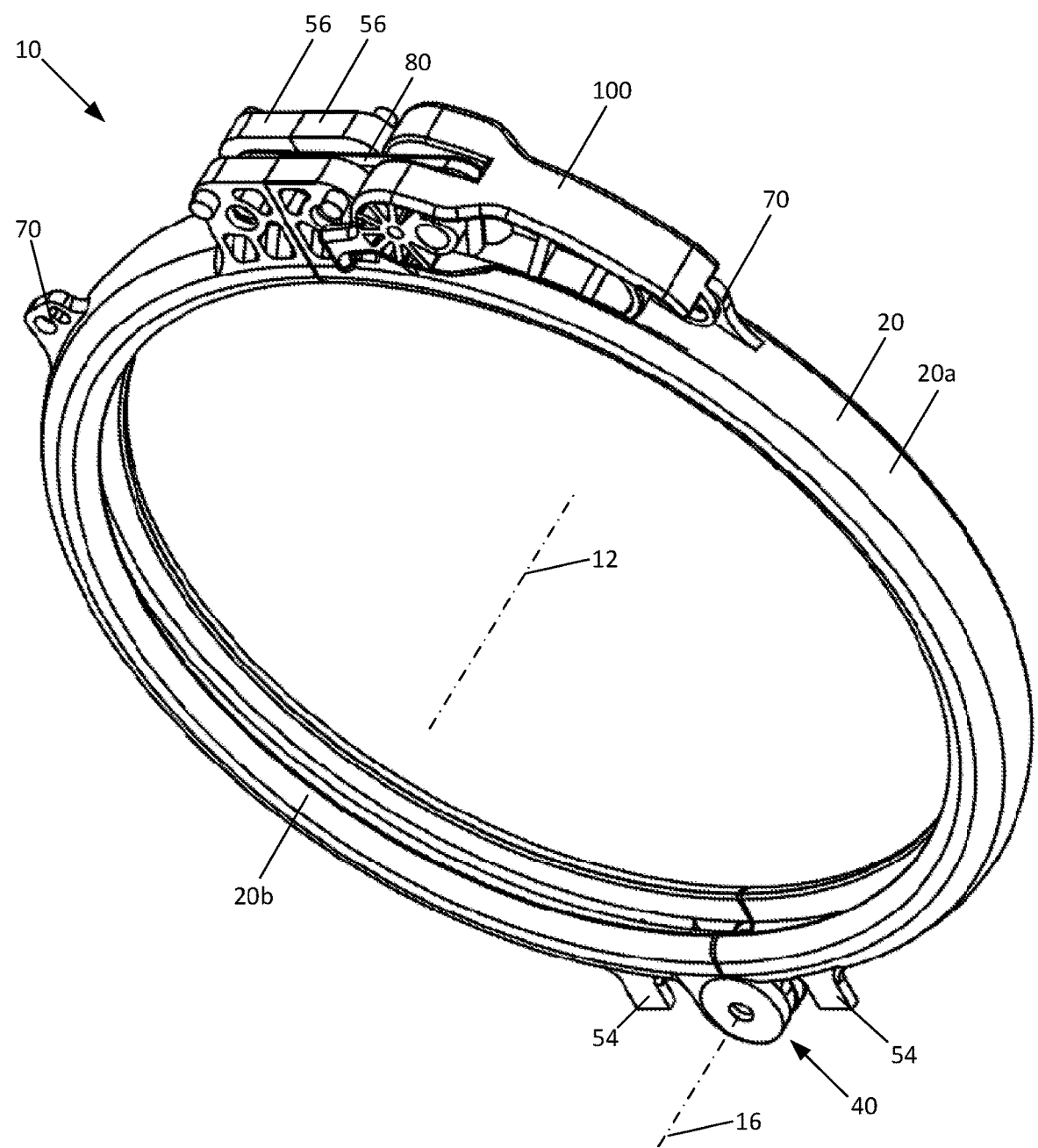
FIG. 1 is a first perspective view of a clamp assembly in accordance with the principles of the present disclosure.
Figure 2:
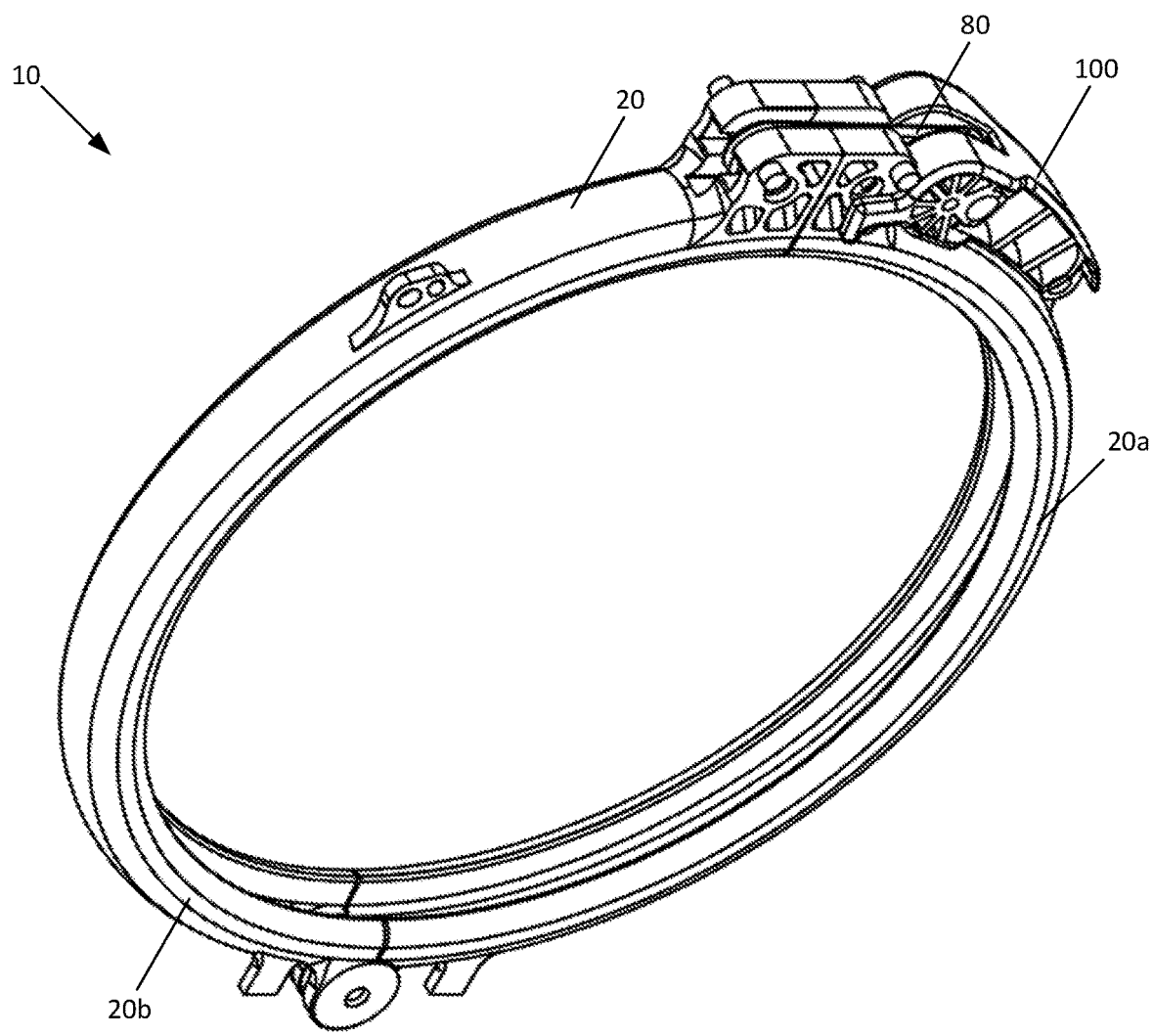
FIG. 2 is a second perspective view of the clamp assembly shown in FIG. 1.
Figure 3:
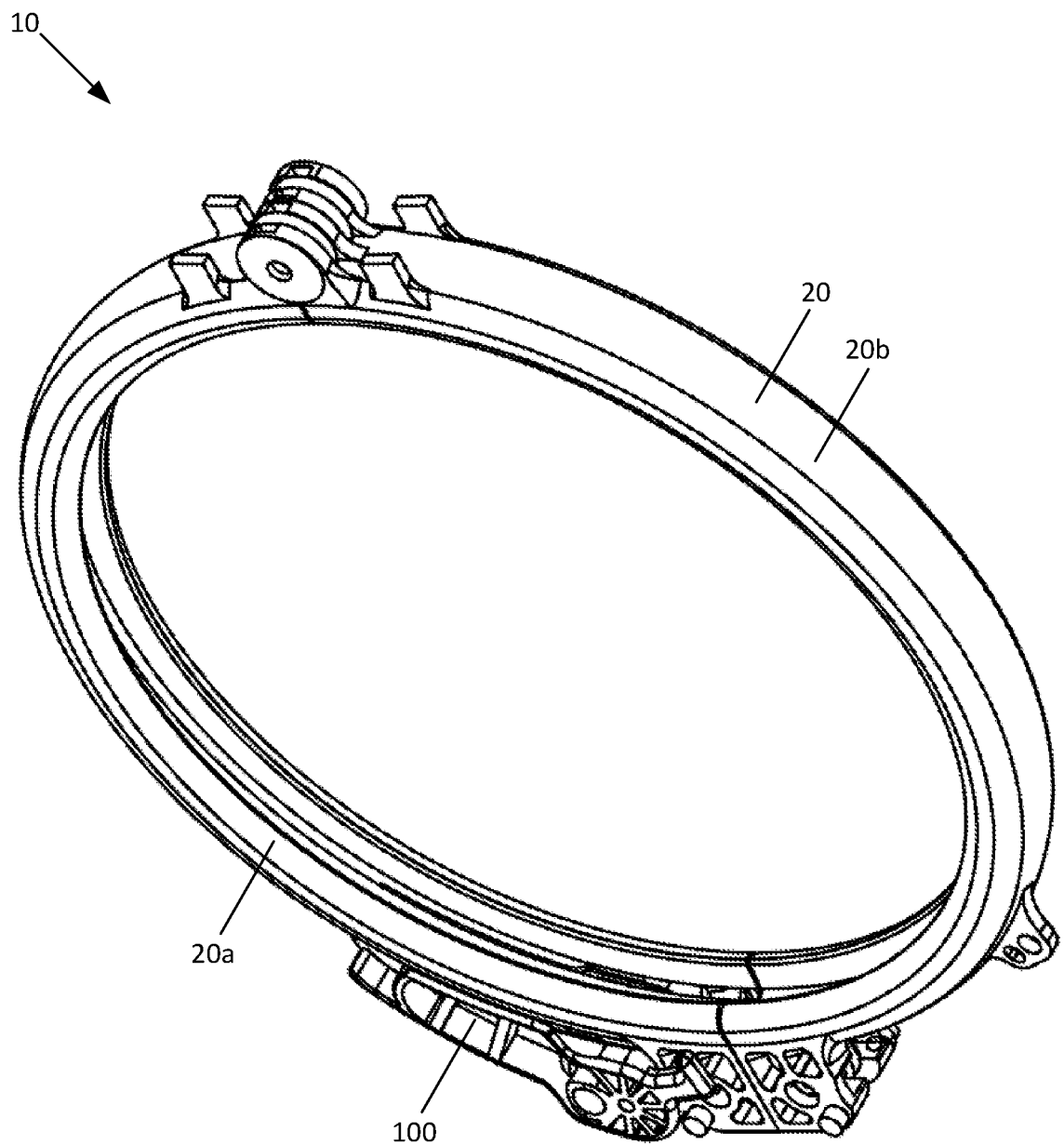
FIG. 3 is a third perspective view of the clamp assembly shown in FIG. 1.
Figure 4:
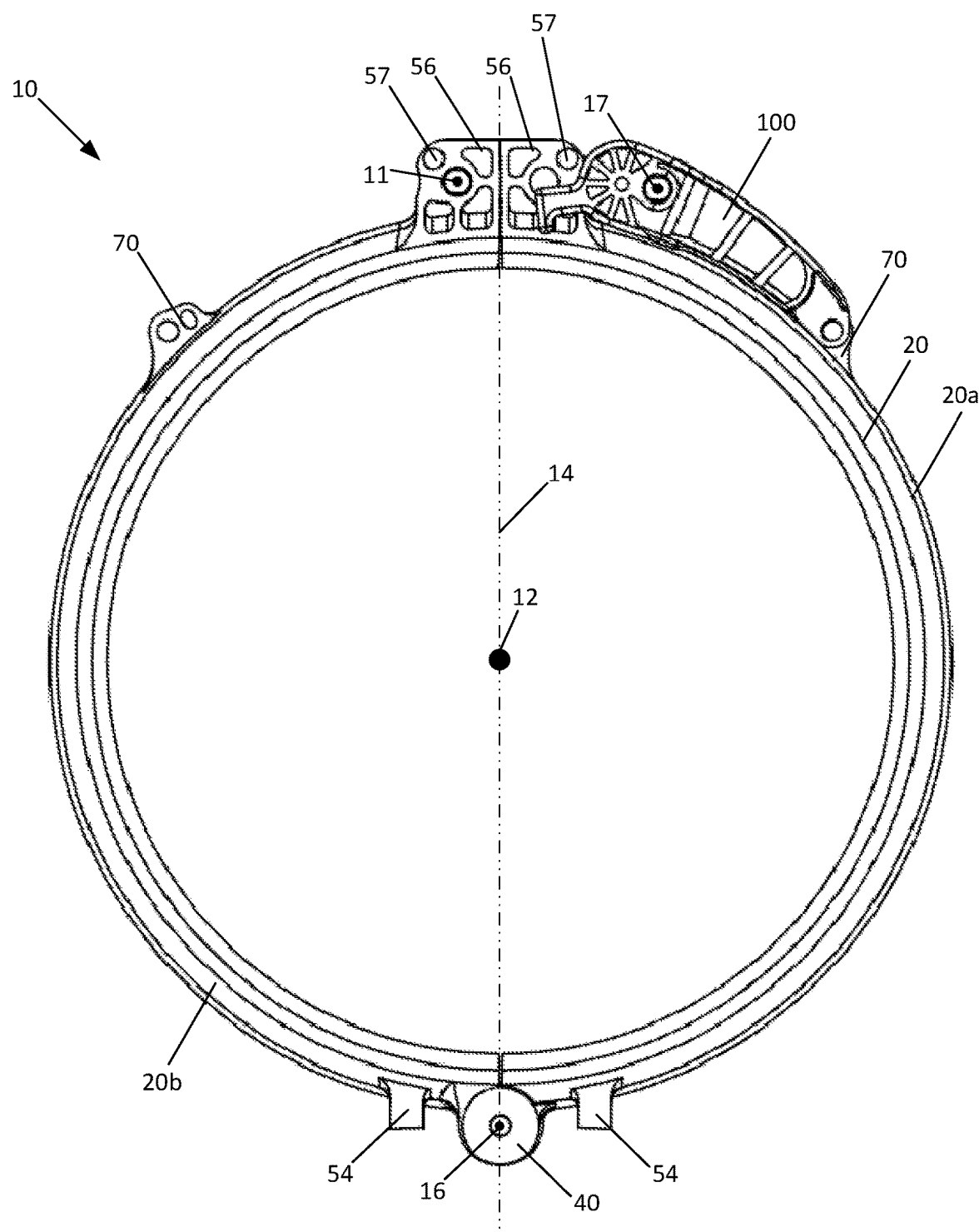
FIG. 4 is a front view of the clamp assembly shown in FIG. 1.
Figure 5:
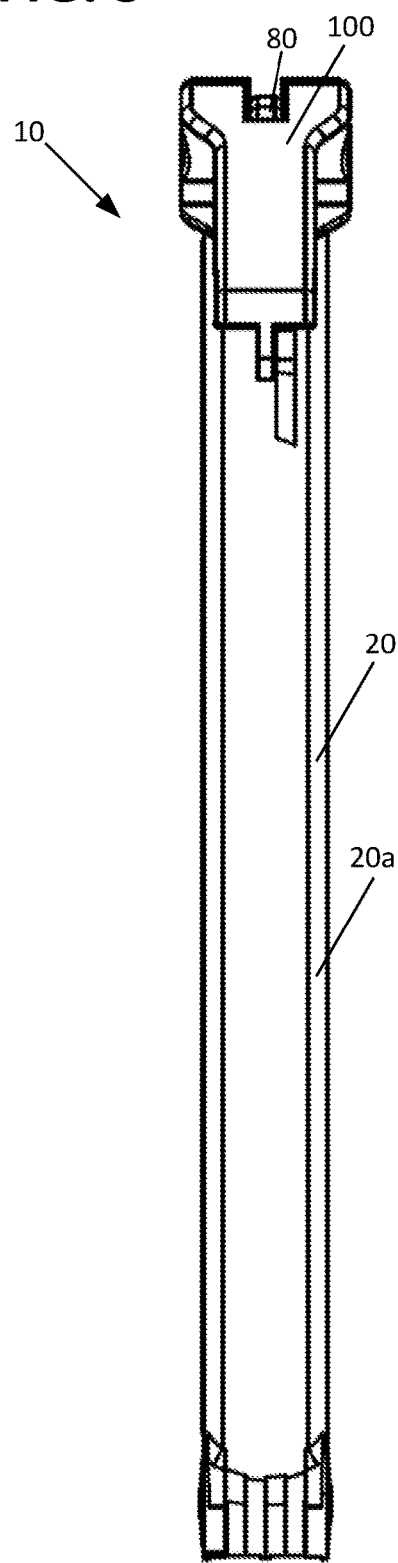
FIG. 5 is a first side view of the clamp assembly shown in FIG. 1.
Figure 6:
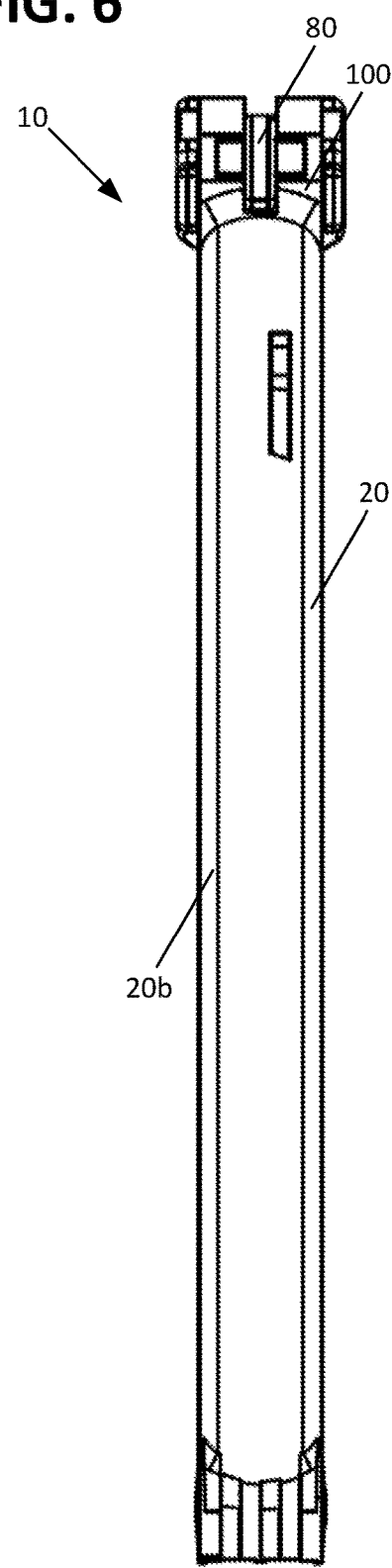
FIG. 6 is a second side view of the clamp assembly shown in FIG. 1.
Figure 7:
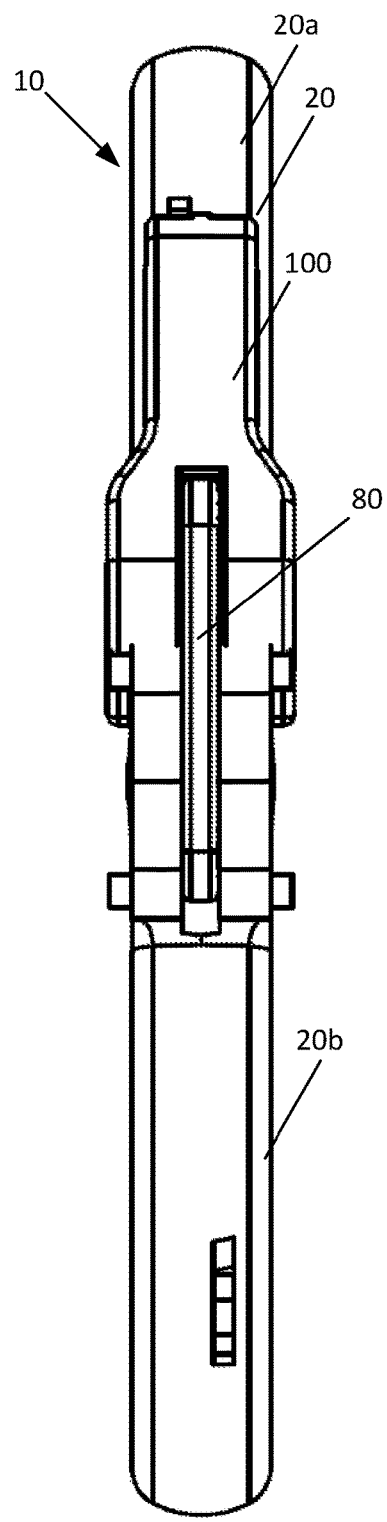
FIG. 7 is a third side view of the clamp assembly shown in FIG. 1.
Figure 8:
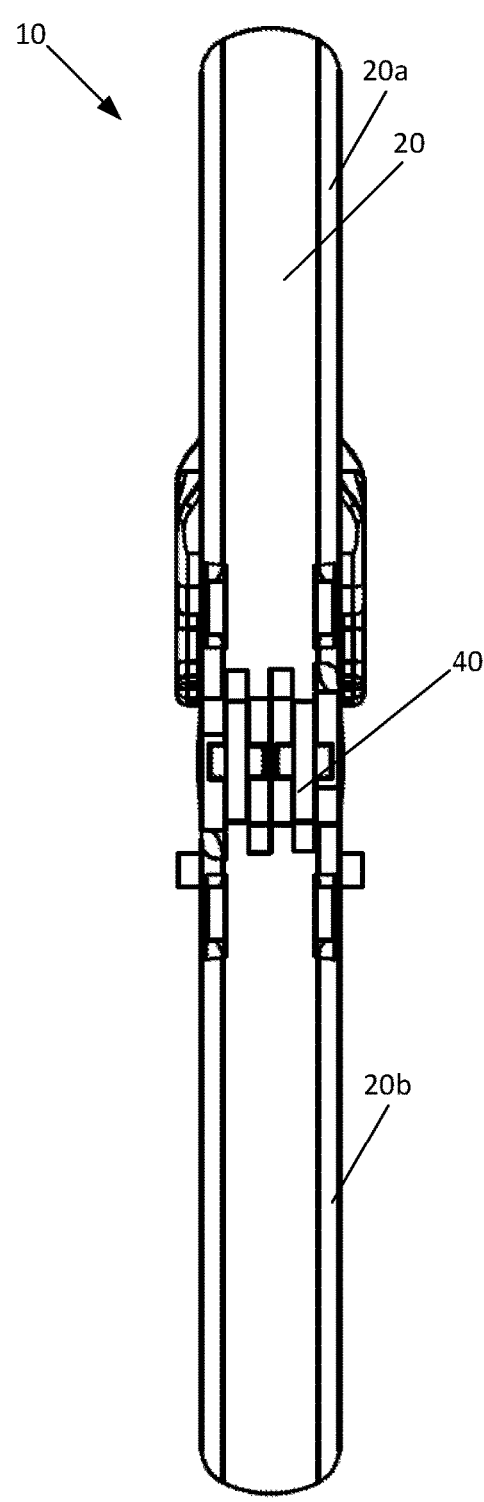
FIG. 8 is a fourth side view of the clamp assembly shown in FIG. 1.
Figure 9:
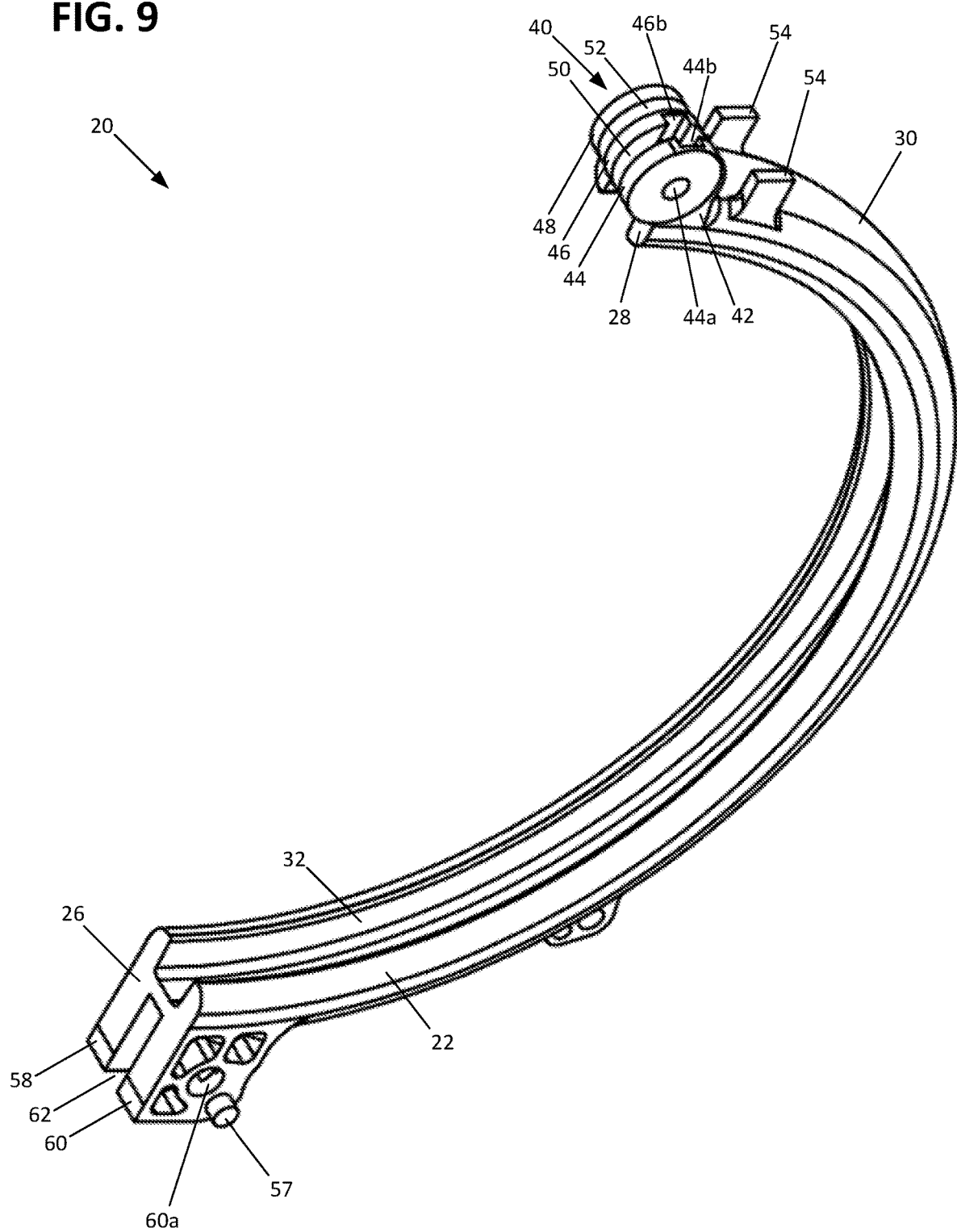
FIG. 9 is a first perspective view of a clamp half-piece of the clamp assembly shown in FIG. 1.
Figure 10:
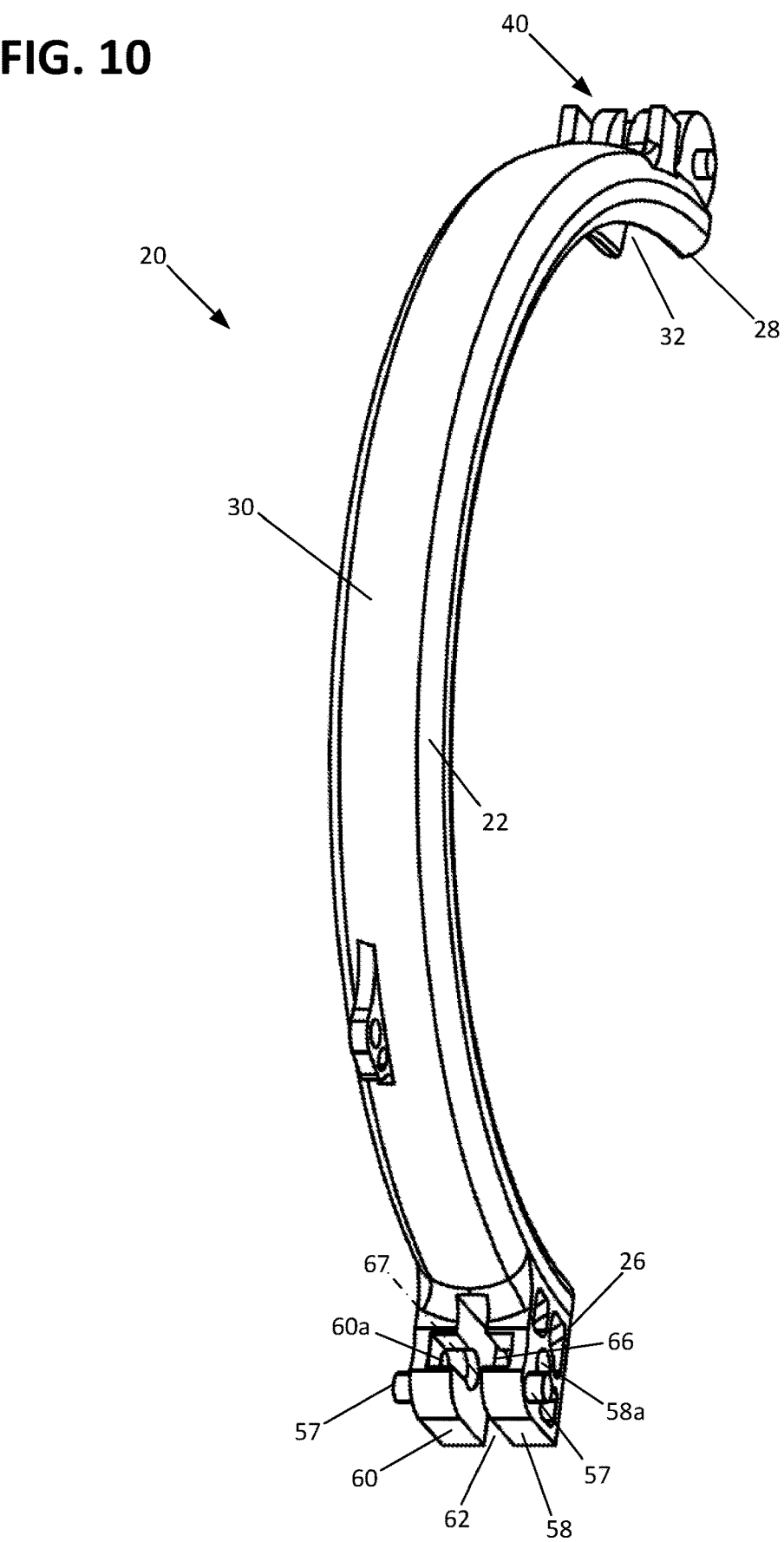
FIG. 10 is a second perspective view of the clamp half-piece shown in FIG. 9.
Figure 11:
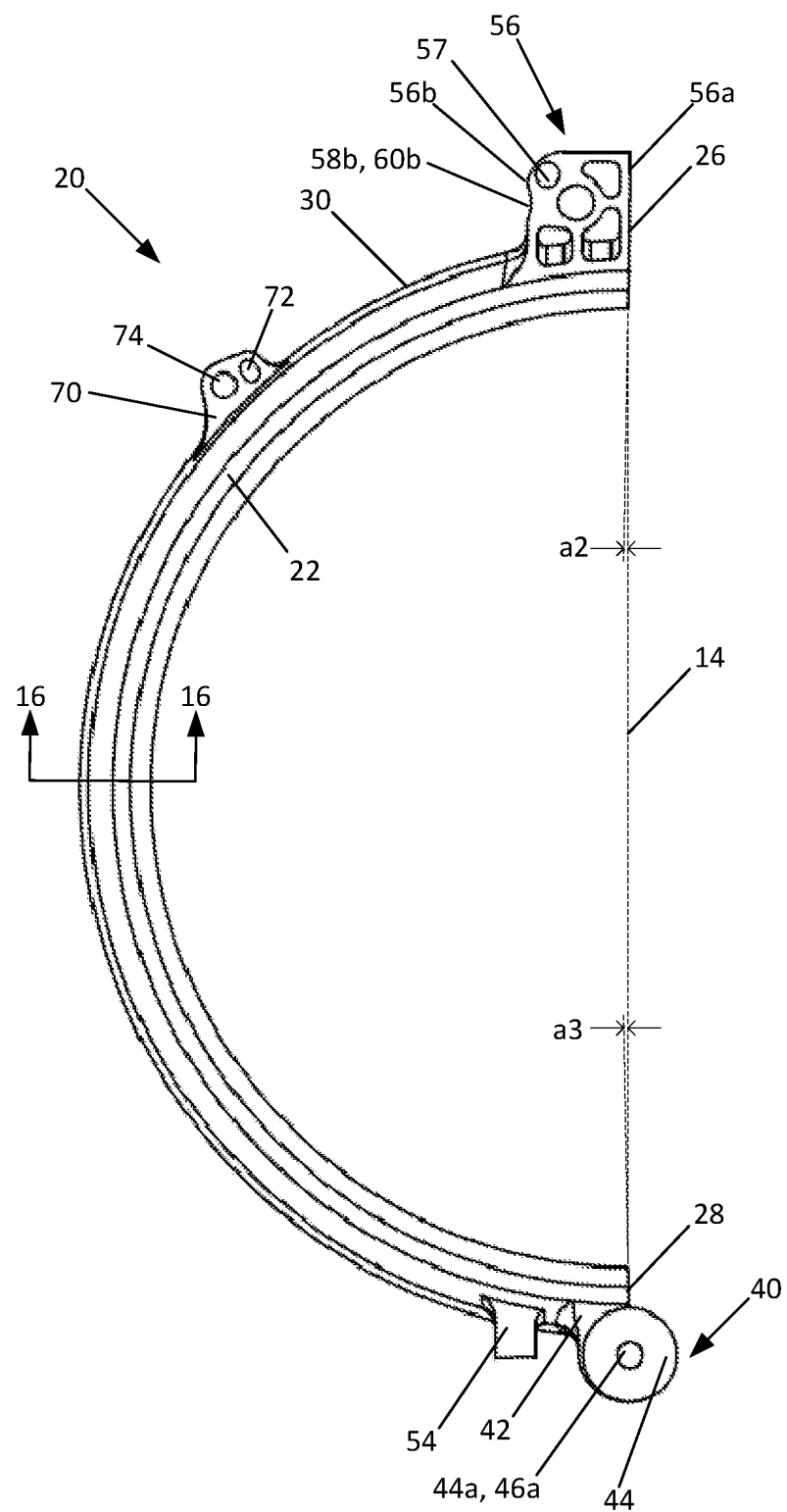
FIG. 11 is a front view of the clamp half-piece shown in FIG. 9.

As most easily seen at FIG. 11, the first end 26 of the clamp half piece 20 is disposed at a slight inward angle a2 to the centerline axis 14 of the clamp 10. Similarly, the second end 28 is disposed at a slight inward angle a3 to the centerline axis 14. In one example, the angles a2 and a3 are about 1 degree. By disposing the first and second ends 26, 28 at the angles a2, a3, the ends 26/26 and 28/28 are disposed at an angle to each other when the clamp 10 is initially placed in the closed position such that primarily only the radially outward portion of the ends 26/26 and 28/28 are in contact with each other with a gap 15 (see FIG. 30) existing at the radially inward portion (i.e. portion nearest axis 12). As the clamp pieces 20a, 20b are clamped together as the lever arm 100 is drawn into a locked position, the radially inward portion of the ends 26/26 and 28/28 are drawn towards each other to either partially or fully close the previously existing gap such that the ends 26/26 and 28/28 are fully or partially flush with each other. By providing this initial gap, a self-tensioning spring-like action is achieved in which the stresses in the clamp half-pieces 20a, 20b are distributed about the entire main body 22 of each half-piece 20a, 20b.

Figure 32:
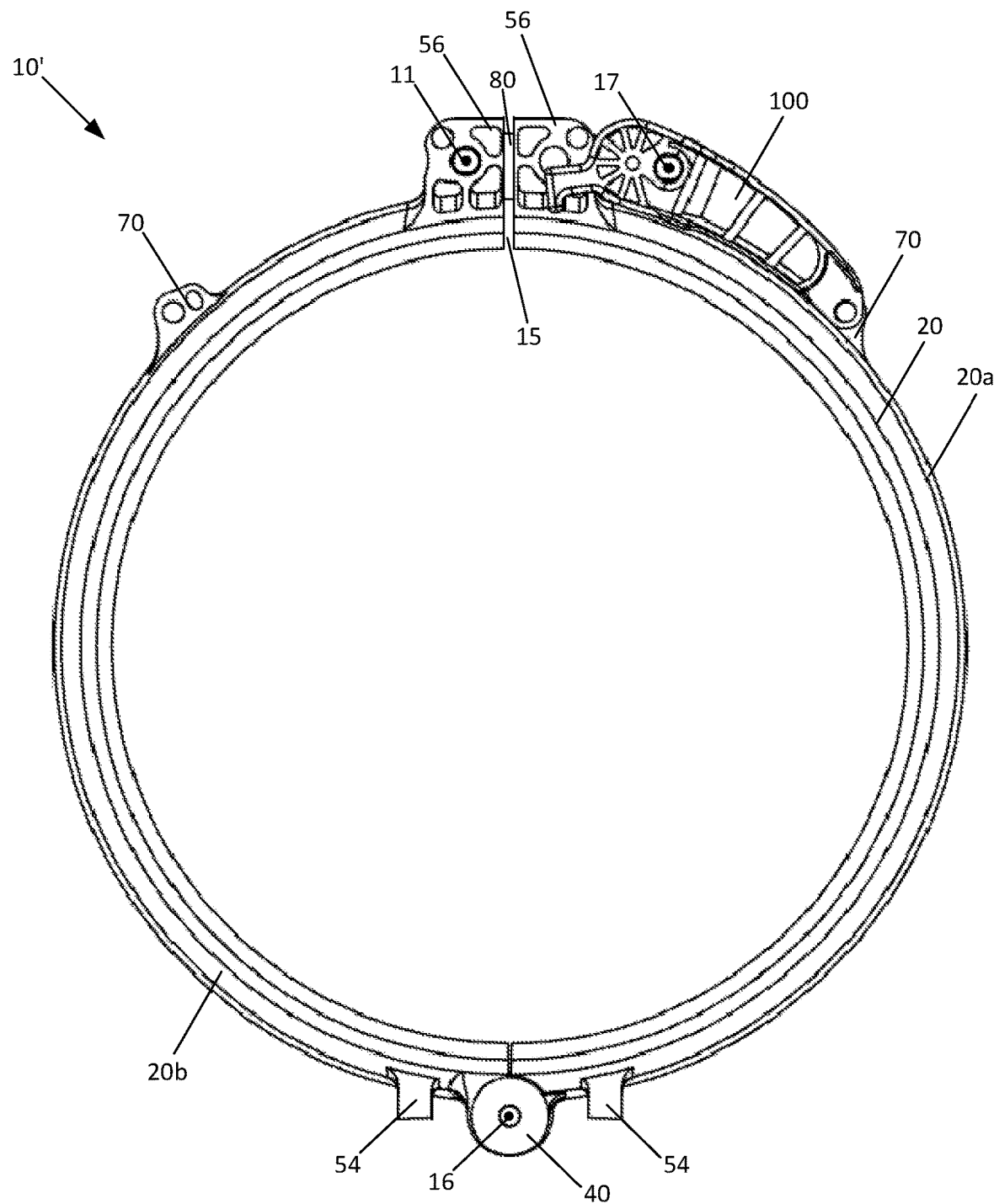
FIG. 32 is a front view of a second example of a clamp assembly in accordance with the principles of the present disclosure.

As can be seen at FIG. 32, the clamp half pieces 20a, 20b can alternatively be configured in a clamp assembly 10' such that the first ends 26 of the half pieces 20a, 20b are not brought into contact with each other as the lever arm 100 is placed into the latched position. The clamp assembly 10' in FIG. 32 is similar to clamp assembly 10 in every respect except for the provision of a whole gap 15 in the assembly 10'. This configuration completely ensures that the stress in the system will be carried by the half pieces 20a, 20b. Additionally, the resulting gap 15 ensures that the natural creep occurring within the half pieces 20a, 20b will be automatically compensated as the lever arm 100 and link arm 80 will continue to exert a closing force onto the half pieces 20a, 20b. It is noted that the feature of providing a partial or fully formed gap 15 is not limited to use with the clamp of the embodiment shown and can be used with other clamp designs, for example clamp assemblies that are assembled together with separate pins.

In one aspect, the body 22 defines an outer surface 30 that extends around an interior channel 32. The outer surface 30 is shown as having a curved or radiused transverse cross-sectional shape, but may be provided with other shapes as well, such as a rectangular or square cross-sectional shape. In the embodiment shown, the bottom portion 102a of the lever arm 100 is provided with a complementarily shaped concave curved surface such that the bottom portion 102a closely follows the convex curved shape of the outer surface 30 in both directions. Thus, the lever arm 100 bottom portion 102a is curved from front-to-back to match the longitudinal arc of the body 22 (i.e. the major dimension of the body 22) and is curved from side-to-side to match the transverse curvature of the body 22 (i.e. the minor dimension of the body 22). The combination of the rounded outer surface 30 and the corresponding curved surface of the lever arm bottom portion 102a allows for a more compact arrangement and also allows for material reduction in the design of the clamp assembly 10. This configuration also allows for a more ergonomic handle for an installer to grasp.

Figure 16:
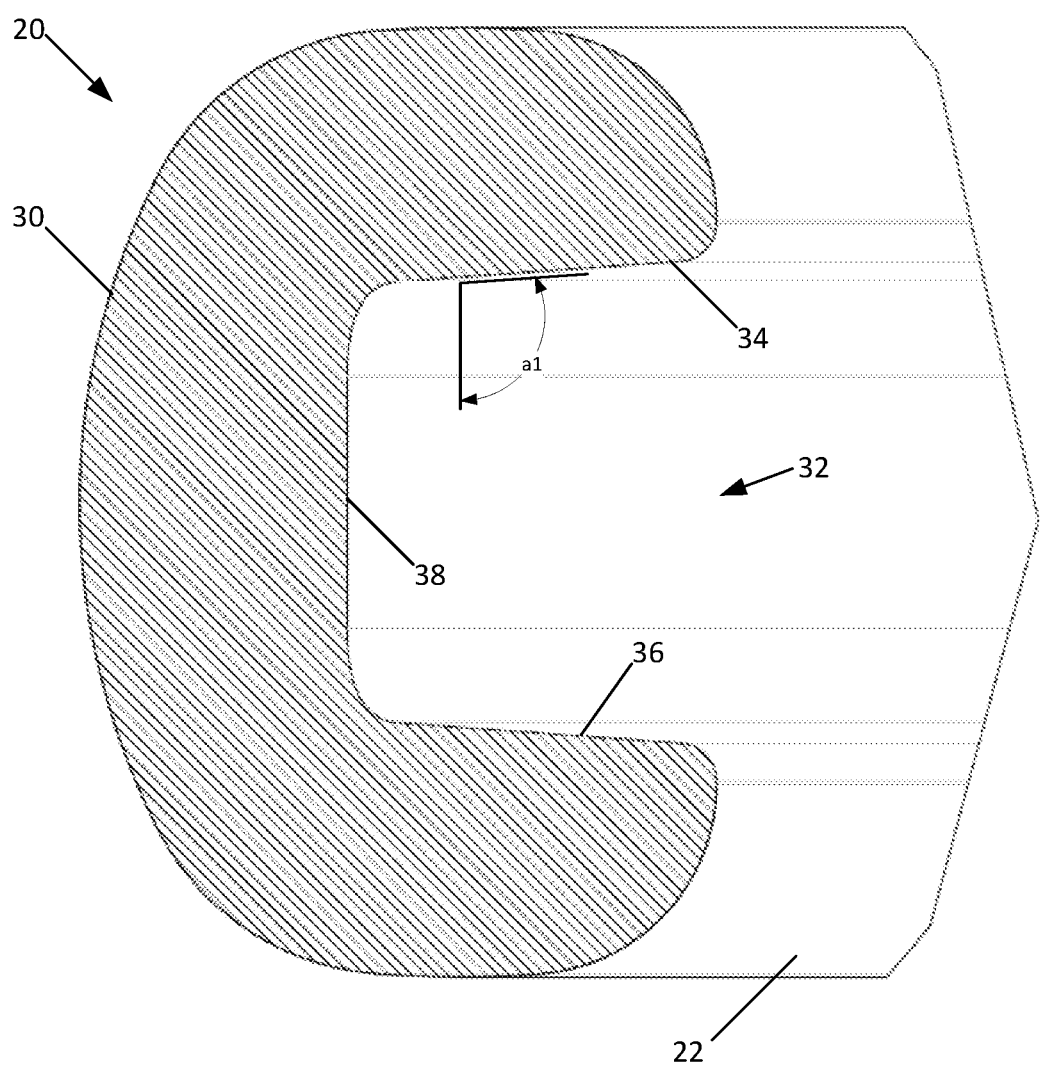
FIG. 16 is a transverse cross-sectional view of the clamp half-piece shown in FIG. 9, taken along the line 16-16 in FIG. 11.
Figure 17:
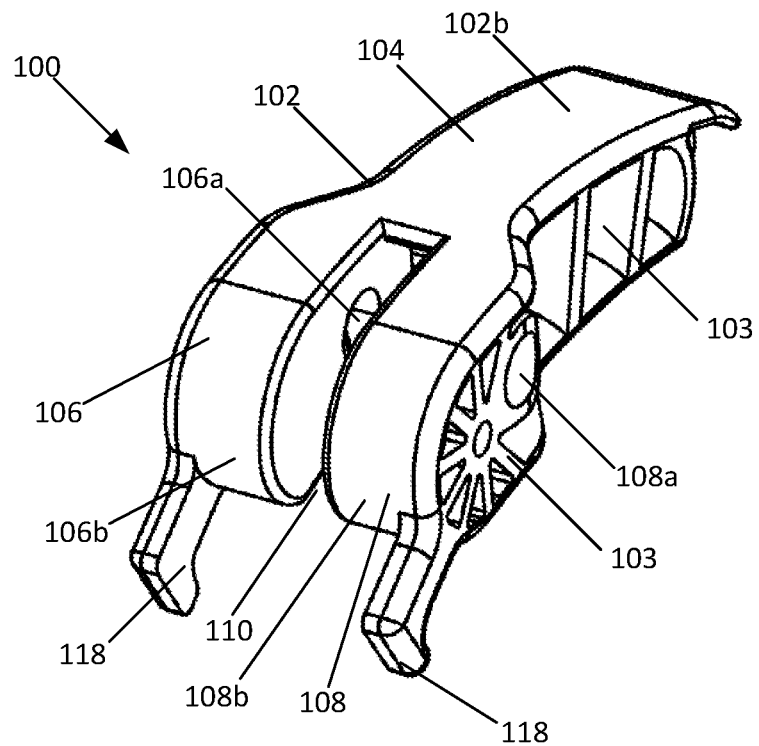
FIG. 17 is a first perspective view of a latch arm of the clamp assembly shown in FIG. 1.
Figure 18:
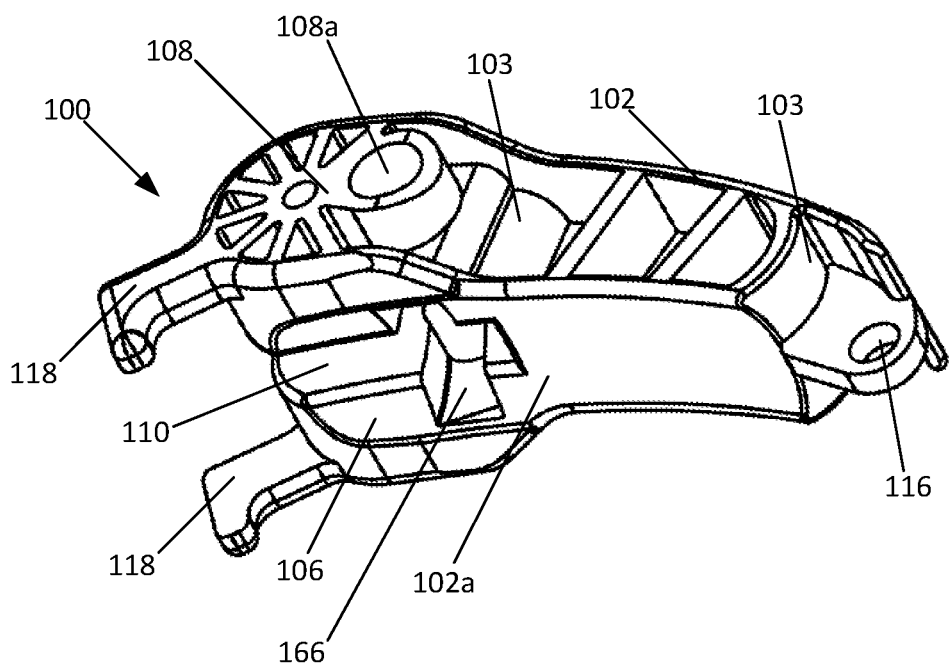
FIG. 18 is a second perspective view of the latch arm shown in FIG. 17.
Figure 19:
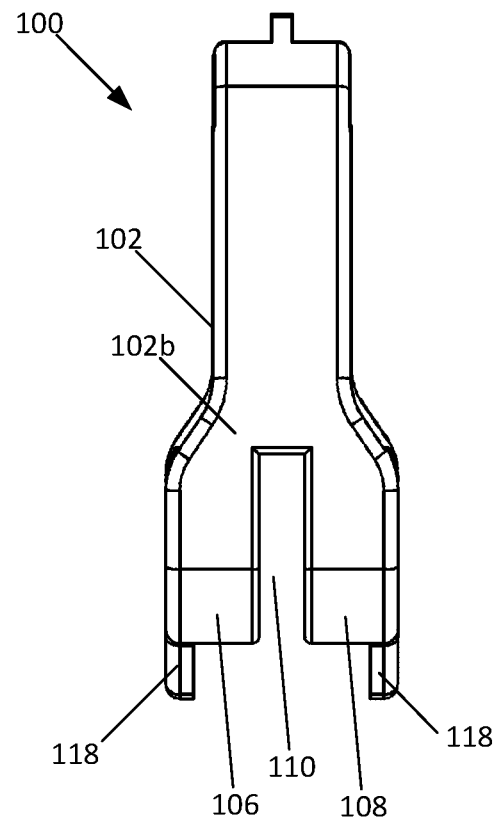
FIG. 19 is a top view of the latch arm shown in FIG. 17.
Figure 20:
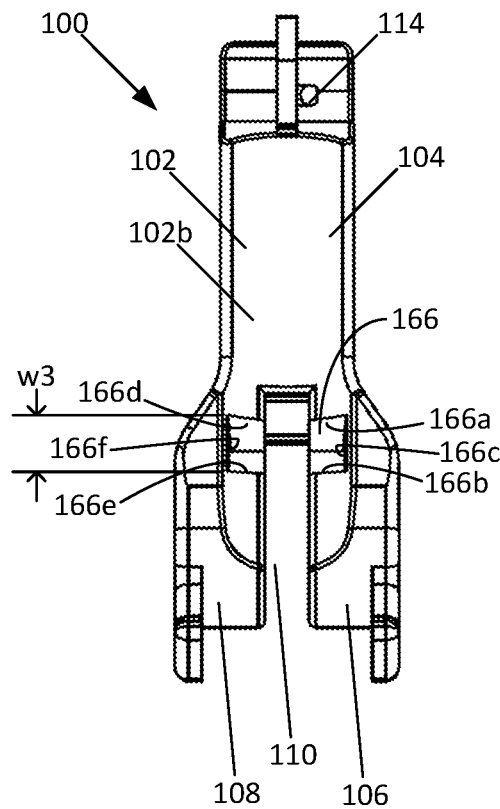
FIG. 20 is a bottom view of the lever arm shown in FIG. 17.
Figure 21:
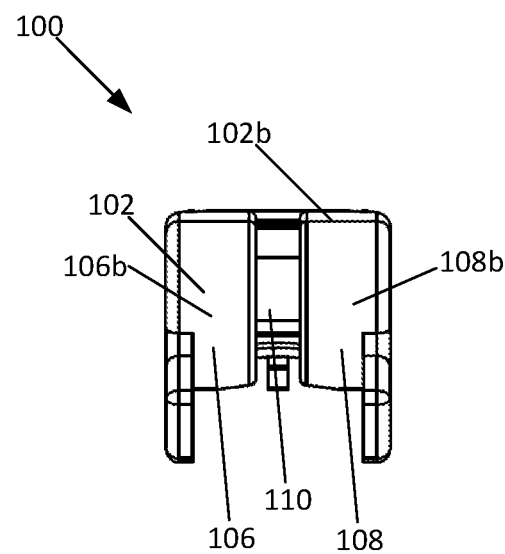
FIG. 21 is a first end view of the lever arm shown in FIG. 17.
Figure 22:
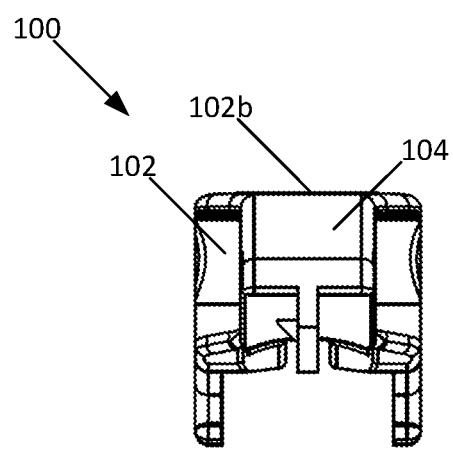
FIG. 22 is a second end view of the lever arm shown in FIG. 17.
Figure 23:
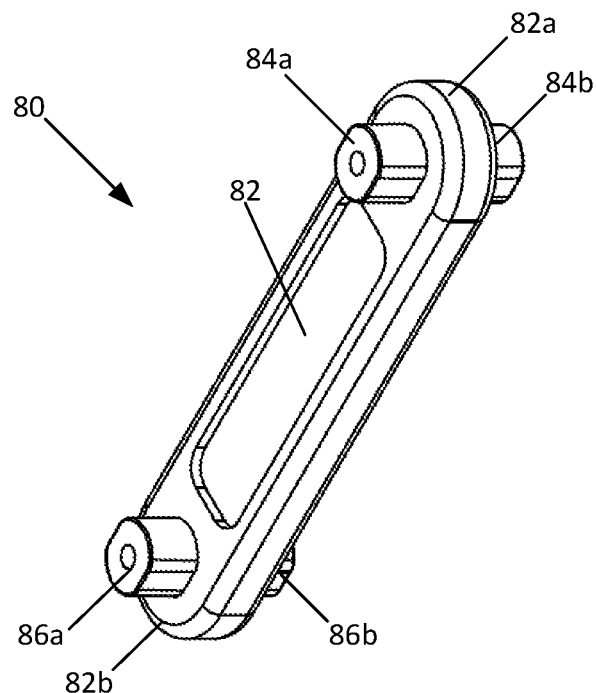
FIG. 23 is a perspective view of a link arm of the clamp assembly shown in FIG. 1.
Figure 24:
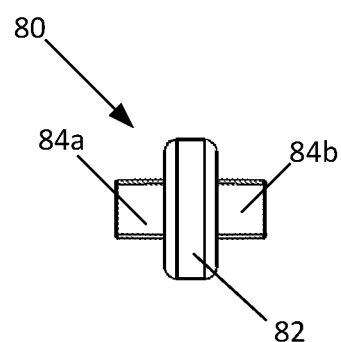
FIG. 24 is an end view of the link arm shown in FIG. 23.
Figure 25:
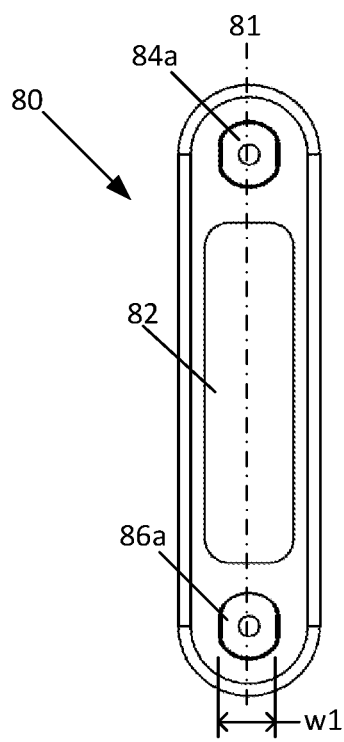
FIG. 25 is a first side view of the link arm shown in FIG. 23.
Figure 26:
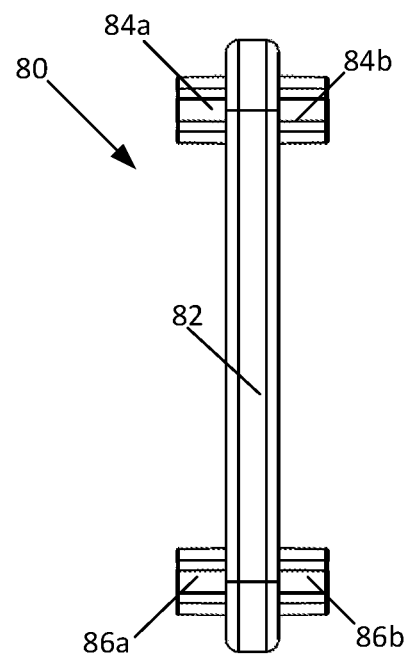
FIG. 26 is a second side view of the link arm shown in FIG. 23.

As most easily seen at the cross-sectional view of FIG. 16, the interior channel 32 of the body 20 is defined by a pair of sidewalls 34, 36 extending from an end wall 38. As shown, the sidewalls 34, 36 are formed at an angle a1 to the end wall 38. As shown, the angle a1 is an obtuse angle, for example about 94 degrees. The angle a1 is provided such that the channel 32 has a transverse cross-sectional profile that gradually narrows as the transverse cross-sectional profile extends from the open side of the channel 32 radially outwardly from the central clamp axis 12. By providing a channel 32 with narrowing or tapering sidewalls 34, 36, the clamp 10 is able to exert a greater and greater closing force onto the flanges of the enclosure as the clamp 10 is moved from the open position and secured into the closed position. This feature also allows for a wider acceptance area of the clamped components when they are initially introduced into the channel 32.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A clamp assembly comprising:
   a) a first clamp half-piece having a generally semi-circular body that extends along a curved path between first and second ends; and
   b) a second clamp half-piece having a generally semi-circular body that extends along a curved path between first and second ends;
   c) wherein the first clamp half-piece is pivotally connected to the second clamp half-piece via a first snap-fit interface including a pin structure and a tapered slot structure extending into an aperture, wherein the pin structure is received through the tapered slot structure and into the aperture such that the pin and apertures are coaxially aligned along a common axis.

2. The clamp assembly of claim 1, wherein the first snap-fit interface includes at least one pin integrally formed on each of the first and second clamp half-pieces and at least one aperture integrally formed on each of the first and second clamp half-pieces.

3. The clamp assembly of claim 1, further comprising:
   a) a link arm pivotally connected to the first clamp half-piece; and
   b) a lever arm pivotally connected to the link arm, the lever arm being configured to retain the first and second clamp half-pieces in a closed position.

4. The clamp assembly of claim 3, wherein the first and second clamp half-pieces include outer surfaces that curve in convex curvatures along the major dimensions and also curve in convex curvatures and wherein the lever arm has a bottom surface that includes concave curvatures to cooperate with the convex curvatures of the first and second clamp half-pieces.

5. The clamp assembly of claim 1, wherein the first and second clamp half-pieces are identically shaped.

6. A clamp assembly comprising:
a) a first clamp half-piece having a generally semi-circular body that extends along a curved path between first and second ends; and
b) a second clamp half-piece having a generally semi-circular body that extends along a curved path between first and second ends, the second clamp half-piece being pivotally connected to the first clamp half-piece via a first snap-fit interface, the first and second clamp half-pieces being identically shaped.

7. The clamp assembly of claim 6, further including:
a) a closure assembly joining the second ends of the first and second clamp half-pieces together, the closure assembly being mounted to one of the first and second clamp half-pieces via a snap-fit connection, wherein each of the first and second clamp half-pieces are configured to provide the snap-fit connection such that the closure assembly can be selectively mounted on either of the first and second clamp half-pieces.

8. The clamp assembly of claim 6, wherein the first snap-fit interface includes at least one pin integrally formed on each of the first and second clamp half-pieces and at least one aperture integrally formed on each of the first and second clamp half-pieces.

9. The clamp assembly of claim 6, further comprising:
a) a link arm pivotally connected to the first clamp half-piece; and
b) a lever arm pivotally connected to the link arm, the lever arm being configured to retain the first and second clamp half-pieces in a closed position.

10. The clamp assembly of claim 9, wherein the first and second clamp half-pieces include outer surfaces that curve in convex curvatures along the major dimensions and also curve in convex curvatures and wherein the lever arm has a bottom surface that includes concave curvatures to cooperate with the convex curvatures of the first and second clamp half-pieces.

11. A clamp assembly comprising:
a) a first clamp half-piece having a generally semi-circular body that extends along a curved path between first and second ends;
b) a second clamp half-piece having a generally semi-circular body that extends along a curved path between first and second ends, the second clamp half-piece being pivotally connected to the first clamp half-piece via a first snap-fit interface located at the first ends of the first and second clamp half-pieces; and
c) a closure assembly joining the second ends of the first and second clamp half-pieces together, the closure assembly being mounted to one of the first and second clamp half-pieces via a second snap-fit connection, wherein each of the first and second clamp half-pieces are configured to provide the second snap-fit connection such that the closure assembly can be selectively mounted on either of the first and second clamp half-pieces.

12. The clamp assembly of claim 11, wherein the first snap-fit interface includes a pin structure and a tapered slot structure extending into an aperture, wherein the pin structure is received through the tapered slot structure and into the aperture such that the pin and apertures are coaxially aligned along a common axis.

13. The clamp assembly of claim 11, wherein the first snap-fit interface includes at least one pin integrally formed on each of the first and second clamp half-pieces and at least one aperture integrally formed on each of the first and second clamp half-pieces.

14. The clamp assembly of claim 11, wherein the closure assembly includes a lever arm and wherein the first and second clamp half-pieces include outer surfaces that curve in convex curvatures along the major dimensions and also curve in convex curvatures and wherein the lever arm has a bottom surface that includes concave curvatures to cooperate with the convex curvatures of the first and second clamp half-pieces.

15. The clamp assembly of claim 11, wherein the first and second clamp half-pieces and the closure assembly are formed from the same material.

\* \* \* \* \*